United States Patent
Wu et al.

(10) Patent No.: US 11,146,860 B2
(45) Date of Patent: Oct. 12, 2021

(54) SERVICE PROCESSING METHOD, DEVICE, AND INTELLIGENT TERMINAL FOR OBTAINING AND DISPLAYING DATA BASED ON TEXTURE DATA CORRESPONDING TO A TARGET SERVICE

(71) Applicant: BANMA ZHIXING NETWORK (HONGKONG) CO., LIMITED, Kowloon (HK)

(72) Inventors: Donglei Wu, Beijing (CN); Hongbo Min, Shanghai (CN); Kui Zheng, Shanghai (CN); Jin Li, Hangzhou (CN); Bo Qiang, Hangzhou (CN); Jinglu Han, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 148 days.

(21) Appl. No.: 16/144,177

(22) Filed: Sep. 27, 2018

(65) Prior Publication Data

US 2019/0104346 A1    Apr. 4, 2019

Related U.S. Application Data

(63) Continuation-in-part of application No. PCT/CN2017/077263, filed on Mar. 20, 2017.

(30) Foreign Application Priority Data

Mar. 29, 2016  (CN) .......................... 201610188356.1

(51) Int. Cl.
   *G06F 9/451*    (2018.01)
   *G06T 11/00*    (2006.01)
   (Continued)

(52) U.S. Cl.
   CPC ........... *H04N 21/812* (2013.01); *G06F 9/445* (2013.01); *G06F 9/451* (2018.02);
   (Continued)

(58) Field of Classification Search
   CPC ........................................ G06Q 30/0241–0277
   See application file for complete search history.

(56) References Cited

U.S. PATENT DOCUMENTS

| 768,163 A | 8/1904 | Willmann, Sr. |
| 9,883,200 B2 | 1/2018 | Jia et al. |

(Continued)

FOREIGN PATENT DOCUMENTS

| CN | 102667706 A | 9/2012 |
| CN | 103581708 A | 2/2014 |

(Continued)

*Primary Examiner* — Ryan McCulley
(74) *Attorney, Agent, or Firm* — Van Pelt, Yi & James LLP

(57) ABSTRACT

Embodiments of the present application relate to a method, apparatus, and system for service processing. The method includes, in response to receiving a startup command for a target application, obtaining texture data corresponding to a target service of the target application, the texture data being obtained from service content that is stored locally on a terminal before the startup command is received, the texture data conforming to a preset texture format, obtaining display content corresponding to the target service based at least in part on the texture data, and providing the display content corresponding to the target service on the terminal.

16 Claims, 7 Drawing Sheets

(51) Int. Cl.
*H04N 21/81* (2011.01)
*H04N 21/443* (2011.01)
*G06Q 30/02* (2012.01)
*G06F 9/445* (2018.01)
*G06T 1/20* (2006.01)

(52) U.S. Cl.
CPC ..... *G06Q 30/0241* (2013.01); *G06Q 30/0269* (2013.01); *G06T 1/20* (2013.01); *G06T 11/001* (2013.01); *H04N 21/443* (2013.01); *H04N 21/8146* (2013.01)

(56) References Cited

U.S. PATENT DOCUMENTS

| | | | |
|---|---|---|---|
| 2004/0010622 A1 | 1/2004 | O'Neill | |
| 2004/0225960 A1 | 11/2004 | Parikh | |
| 2005/0024376 A1 | 2/2005 | Gettman | |
| 2006/0010374 A1 | 1/2006 | Corrington | |
| 2008/0004954 A1* | 1/2008 | Horvitz | G06Q 30/02 705/14.49 |
| 2008/0263673 A1 | 10/2008 | Brun | |
| 2009/0319375 A1* | 12/2009 | Dharmaji | G06Q 30/0267 705/14.64 |
| 2011/0167486 A1* | 7/2011 | Ayloo | H04W 4/23 726/7 |
| 2012/0096431 A1* | 4/2012 | Madar | H04L 67/20 717/110 |
| 2013/0219426 A1* | 8/2013 | Zweig | H04N 21/4784 725/32 |
| 2014/0289040 A1* | 9/2014 | Green | G06Q 30/0276 705/14.49 |
| 2015/0186949 A1* | 7/2015 | Smits | G06Q 30/0269 705/14.66 |
| 2015/0348305 A1* | 12/2015 | Goossens | G06F 8/71 345/419 |
| 2016/0182945 A1* | 6/2016 | Kim | H04N 21/4126 725/32 |
| 2017/0053314 A1* | 2/2017 | Glover | G06Q 30/0256 |

FOREIGN PATENT DOCUMENTS

| | | |
|---|---|---|
| CN | 103605534 A | 2/2014 |
| CN | 103686359 A | 3/2014 |
| CN | 105302608 A | 2/2016 |

\* cited by examiner

SERVICE PROCESSING METHOD, DEVICE, AND INTELLIGENT TERMINAL FOR OBTAINING AND DISPLAYING DATA BASED ON TEXTURE DATA CORRESPONDING TO A TARGET SERVICE

CROSS REFERENCE TO OTHER APPLICATIONS

This application is a continuation-in-part of and claims priority to International (PCT) Application No. PCT/CN2017/077263 entitled SERVICE PROCESSING METHOD, DEVICE, AND INTELLIGENT TERMINAL, filed Mar. 20, 2017 which is incorporated herein by reference in its entirety for all purposes, which claims priority to China Patent Application No. 201610188356.1 entitled A SERVICE PROCESSING METHOD, DEVICE, AND SMART TERMINAL filed on Mar. 29, 2016 which is incorporated by reference in its entirety for all purposes.

FIELD OF THE INVENTION

The present application relates to the field of information processing technology; in particular, the present application relates to method, device, and system for processing services.

BACKGROUND OF THE INVENTION

The continually increasing popularity of smart terminals such as mobile telephones, tablet computers, and smart televisions, has led to more effective user operations resulting from human-computer interaction. A user interface is an important aspect in human-computer interaction, particularly in applications (also referred to as application programs) running on smart terminals. In addition, rendering engines employing advanced rendering technology are important in improving user experience with smart terminals and, in particular, with the user interface of the smart terminals.

Because rendering engines generally require preparation of a substantial number of resources during a startup process of an application and perform a rendering processing on the prepared resources, conventional smart terminals generally require substantially long rendering times from a time at which an application startup command is received from a user until a time at which rendering is completed. In addition, conventional terminals generally display a single screen to a terminal while awaiting the completion of rendering. For example, if a startup interface of an application is a simple interface, the rendering time regularly exceeds 500 ms, and if a startup interface of an application is a complex interface, the rendering time often exceeds 2 s.

In order to avoid the presenting to users of a single screen while the user is awaiting completion of rendering, conventional art can display advertisement content before rendering is complete, thus not only improving the user experience, but also disseminating the content of the advertisement to the user.

However, in the course of implementing the display of advertisement content during the rendering, the display time of the advertisement content often extends far longer than the triggering time of the startup command. Accordingly, the display of advertisement content not only increases a waiting time for the user, but also shortens the length of time the advertisement content is displayed.

In view of the above, there is a need for a method, device, and system for more efficiently and effectively rendering during start up an application.

BRIEF DESCRIPTION OF THE DRAWINGS

Various embodiments of the invention are disclosed in the following detailed description and the accompanying drawings.

DETAILED DESCRIPTION

Figure 1:
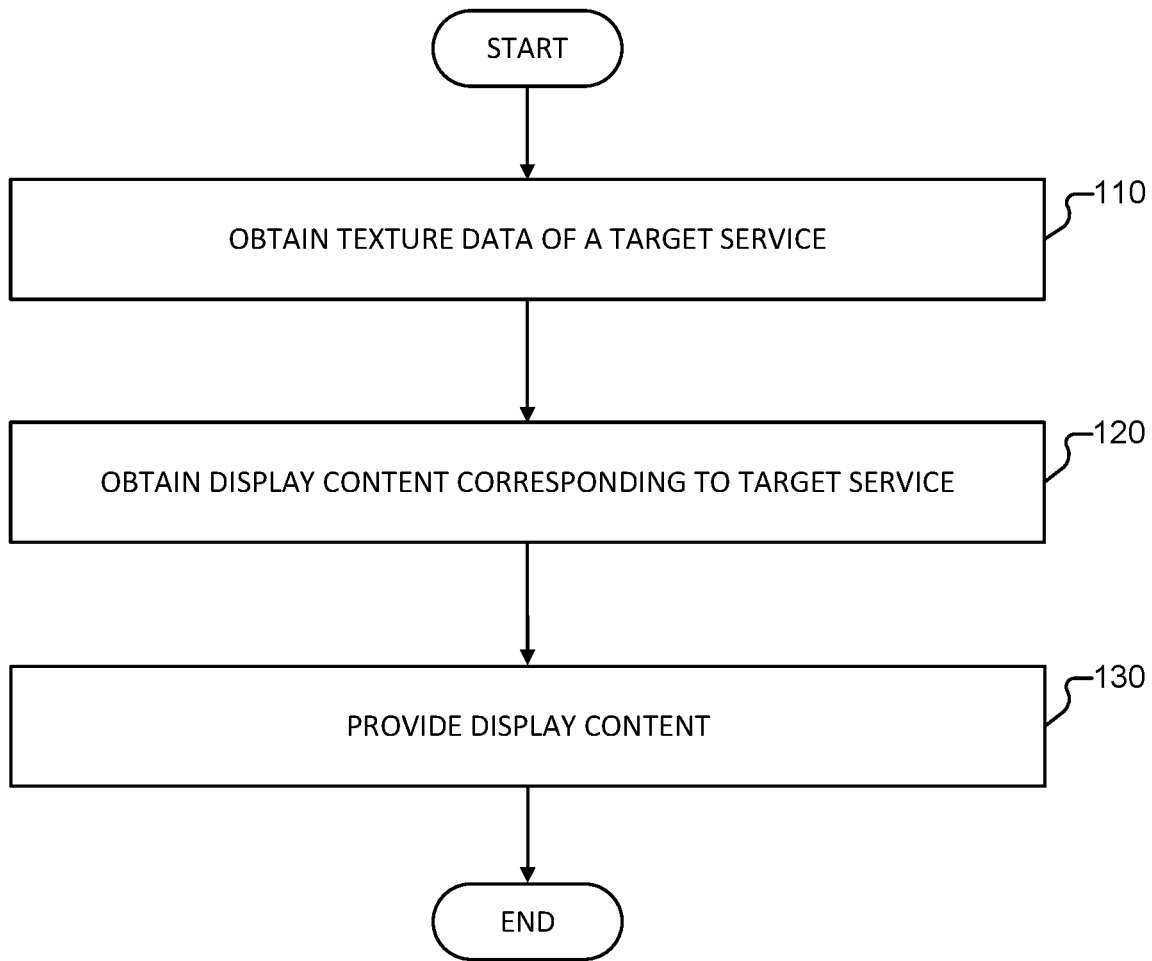
FIG. 1 is a flowchart of a method for processing a service according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to make the aforementioned purpose, features, and advantages of the present application clearer and easier to understand, the present application is described in further detail below in light of the drawings and specific embodiments.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

A terminal can be connected to one or more peripherals (e.g., smart peripherals). For example, the terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

Conventional terminals typically create a target application process after receiving a startup command for the target application running on a smart terminal, and the target application process performs the display processing of corresponding advertisement content during the startup of the application. The target application corresponds to an application that is selected or invoked to run on the terminal. The display processing according to the conventional art can comprise: requesting the advertisement content from an advertising server, and converting advertisement content into display content that can be displayed. As an example, the conversion of the advertisement content into the display content comprises converting the advertisement content into corresponding texture content based on decoding processing, rendering the texture content by a graphics processing unit (GPU), and presenting the rendering results on the smart terminal. Accordingly, the conventional display processing requires substantial resources (e.g., time resources and processing resources). Because of the significant amount of time to complete the conventional display processing, advertisement content is displayed much later than a time at which the startup command is received.

According to various embodiments, in response to receiving a startup command for a target application, texture data of a target service corresponding to the target application is obtained from service content stored in advance. The texture data conforms to a preset texture format. As an example, the graphics processing unit is configured to (e.g., able to) recognize the texture data based at least in part on the preset texture format. In some embodiments, the graphics processing unit obtains display content corresponding to the target service. For example, the graphics processing unit processes the texture data to obtain the display content corresponding to the target service. In response to obtaining the display content corresponding to the target service, the terminal (e.g., the graphics processing unit) displays the content corresponding to the target service (e.g., on a display unit of the smart terminal). In contrast to conventional techniques according to which the corresponding service content is retrieved from an advertising server after receiving, from a user, a startup command with respect to the target application, because the corresponding service content retrieved from the service content is stored in advance as pre-processed texture data of the target service corresponding to the target application, various embodiments process (e.g., generate) texture data that conforms to a preset texture format before the terminal obtains the startup command of the target application. Accordingly, in contrast to conventional techniques for displaying service content, the retrieval speed of the service display content according to various embodiments is increased, thereby reducing the time before the display of the service content.

Various embodiments do not require the performance of decoding processing of the service content in connection with starting up the target application. Rather, in some embodiments, the texture data is provided to the GPU for rendering processing in connection with obtaining the corresponding service display content. Accordingly, the corresponding decoding processing time is reduced in contrast to conventional techniques for displaying service content, and the retrieval speed of the service display content is increased, reducing the time before the display of the service content.

Various embodiments conserve the memory used in connection with decoding processing. Accordingly, the peak memory of the smart terminal is reduced in contrast to conventional implementations for displaying service content.

FIG. 1 is a flowchart of a method for processing a service according to various embodiments of the present application.

Referring to FIG. 1, process 100 is provided. Process 100 can be implemented in connection with process 200 of FIG. 2, process 300 of FIG. 3, process 400 of FIG. 4, and/or process 600 of FIG. 6. Process 100 can be implemented in connection with system 500 of FIG. 5. Process 100 can be implemented at least in part by system 700 of FIG. 7.

At 110, texture data of a target service is obtained. In some embodiments, the target service is obtained in connection with the startup (e.g., launch) of an application (e.g., the target application). For example, in response to receiving a startup command for the target application, texture data of the target service corresponding to the target application is obtained. In some embodiments, the startup command is obtained in connection with a user input to the terminal such as selection of an icon corresponding to the application, etc. In some embodiments, the startup command is obtained in response to a process or application invoking the application based at least in part on one or more conditions being satisfied (e.g., a context of the terminal, in response to a function of an application being performed, etc.). The texture data of the target service corresponding to the target application can be obtained from service content stored in advance. In some embodiments, the terminal obtains the texture data from a local storage. In some embodiments, the terminal obtains the texture data from a server. In some embodiments, the texture data is stored in a predefined format on the server. As an example, the texture data can be stored at an advertisement server, and the terminal can obtain the texture data from the advertisement server in response to the application being launched. In some embodiments, the target service corresponds to an advertisement service. The texture data can correspond to advertising content. In some embodiments, the texture data is configured based at least in part on a preset texture format. As an example, the texture data is configured according to a preset texture format that the graphics processing unit is configured to recognize.

At 120, display content corresponding to the target service is obtained. In some embodiments, the display content corresponding to the target service is obtained based at least in part on the texture data of the target service. The graphics processing unit can process (e.g., read into memory) the texture data to obtain the display content corresponding to the target service. The display content can correspond to service content such as advertisement content. The display content can comprise an image, a video, etc. In some embodiments, the display content can be obtained simultaneously with or prior to the texture data.

At 130, display content is provided. In some embodiments, the display content corresponding to the target service is displayed on a display unit of the smart terminal. The display content can be displayed during startup of the application.

According to various embodiments, the target service corresponds to one or more of advertising services, weather forecasting services, caller ring back tones, etc. According to various examples described herein, the target services correspond to the advertising services. However, various embodiments are implemented in other services.

According to various embodiments, the terminal obtains service content from a server. The terminal can obtain the service content in response to an application being invoked (e.g., launched or started up). In response to the terminal obtaining the service content, the terminal obtains texture data (e.g., corresponding to the target service) from the service content. For example, the terminal converts the service content (or a portion thereof) to the texture data. An application or the central processing unit of the terminal can obtain the texture data from the service content and the texture data can be provided to the graphics processing unit in connection with obtaining the display content to be displayed. In some embodiments, the texture data is obtained from the server. For example, rather than obtaining service content from a server and converting the service content to the texture data (or obtaining the texture data from the service content), the terminal obtains the texture data from the server (e.g., to circumvent processing associated with local processing of the service content to obtain the texture data).

In some embodiments, the target service is an advertisement service. The service content can be obtained from service servers such as an advertising server. In response to obtaining the service content, the texture data of the target service is obtained (e.g., from the service content). The service content can be stored in a file (e.g., an image file, a video file, etc.). The file format can be in accordance with a specific information encoding method used to store information, which can be stored on a magnetic disk or in memory. Graphics processing units generally cannot recognize or process various file formats because although graphics processing units are adept at vector computing, the graphics processing units are not configured to perform complex calculations associated with processing certain file formats in which content can be stored. Therefore, after file formats, which is typically not easily be read by a graphics processing unit, are read by an application, the file formats are converted by the CPU into texture formats such as R5G6B5, A4R4G4B4, A1R5G5B5, R8G8B8, A8R8G8B8, etc., which are readable by the graphics processing unit. Various other texture formats can be implemented. The texture data configured in the texture format is then provided to the graphics processing unit. For example, the texture data is provided to the graphics processing unit to process the texture data to obtain the display content. According to various embodiments, the texture formats are pixel formats that the GPU is able to recognize and process. The texture format of the texture data can correspond to a format that the graphics processing unit is configured to sample and process quickly.

The display time of the advertisement content according to conventional implementations is much later than the startup or launch of an application (e.g., the trigger time of the startup command). Various embodiments store the texture data of services (e.g., texture data of a target service such as an advertisement service) in advance. The texture data can conform to a preset texture format. For example, the preset texture format can correspond to a format that the graphics processing unit is configured to process (e.g., a format that the GPU is able to recognize). The use of a preset texture format enables the GPU to process the texture data to obtain the display content corresponding to the target service. For example, the GPU can perform rendering processing of the texture data to obtain the corresponding display content.

According to various embodiments, service content stored in advance comprises: service content that corresponds to the predefined settings or preferences of a user. The service content can be stored in advance (e.g., before the startup command for the application is invoked and/or before the texture data is obtained). The storing of the service content can comprise obtaining service content before the startup command for the target application is obtained. The service content can be obtained based at least in part on the preferences, settings, historical or usage information, or user profile of the user (e.g., the user associated with the terminal). For example, the server provides service content to the terminal based at least in part on the preferences, settings, historical or usage information, or user profile of the user. The user can select the service content to provide to the terminal based at least in part on the preferences, settings, historical or usage information, or user profile of the user, and provide to the terminal the selected content. In some embodiments, the terminal sends a query for service content to the server. The query can comprise, or be sent in connection with, information pertaining to the preferences, settings, historical or usage information, or user profile of the user.

In response to obtaining the service content, texture data is obtained (e.g., generated or determined) based at least in part on the service content. In some embodiments, the service content is converted into texture data. Library function calls are provided to make the conversion. As an example, the service content, which is an image or video file, can be converted into texture data in a preset texture format. The preset texture format can correspond to a format that a graphics processing unit is configured to process (e.g., from which the graphics processing unit generates or determines display content). For example, the preset texture format corresponds to texture formats R5G6B5, A4R4G4B4, A1R5G5B5, R8G8B8, A8R8G8B8, etc. According to various embodiments, the texture data is obtained before the startup command for the application is invoked. According to various embodiments, the texture data is generated or determined before the startup command for the application is invoked (e.g., before the application is launched).

In response to obtaining (e.g., generating or determining) the texture data, the texture data is stored. The texture data can be stored locally or at a server. In some embodiments, the texture data is stored before the startup command for the application is invoked (e.g., before the application is launched).

The use of preferences, settings, or user profile of the user in connection with obtaining the corresponding service content can increase the compatibility of the service content with the user (e.g., the preferences, settings, historical or usage information, or user profile of the user). Accordingly, more accurate or relevant service content (e.g., advertisements) is displayed to the user. For example, service content in which the user is likely to be more interested in is provided to the user. As a result, the hit rate of the service content (e.g., rate that the service content is selected or clicked on by the user) can be improved.

According to various embodiments, the preferences, settings, historical or usage information, or user profile of the user comprises one or more of user attributes, one or more user preferences, etc. The one or more user attributes can comprise relatively stable static attribute characteristics, such as an age of a user, a sex of a user, a geographical region of a user (e.g., a region where the user is located or resides), an educational background of the user, a shopping district of the user (e.g., a preferred shopping district, or a shopping district within a predefined threshold distance of the user), an occupation of the user, a marital status of the user, a consumer rating of the user, etc.

According to various embodiments, the preferences, settings, historical or usage information, or user profile of the user comprises one or more characteristics of the user. The one or more characteristics of the user can be dynamic. For example, the one or more characteristics of the user can be changed (e.g., updated) based at least in part on user behavior. In some embodiments, the one or more characteristics of the user comprises a user preference with respect to content (e.g., service content, video content, audio content, image content, news content, webpage content, game content, etc.). For example, if the one or more characteristics of the user includes "soccer," the user is deemed to be interested in "soccer." Accordingly, service content corresponding to "soccer" can be obtained (e.g., retrieved) and provided to the user (e.g., the corresponding texture data for the service content is used to generate display content that is displayed to the user). As another example, if the one or more characteristics of the user includes "shopping," the user is deemed to be interested in "shopping." Accordingly, service content corresponding to "shopping" can be obtained (e.g., retrieved) and provided to the user.

The service content and/or the corresponding texture data can be stored and/or obtained before the application (e.g., the target application) is launched (e.g., before the corresponding startup command is obtained). According to various embodiments, the corresponding timing of the storage and/or the obtaining of service content and/or the corresponding texture data comprises: the service content and/or the corresponding texture data being stored and/or obtained before the current startup of the smart terminal, or, service content and/or the corresponding texture data being stored and/or obtained after the current startup of the smart terminal and before the startup command for the target application is received. Various other timing for obtaining the service content can be implemented.

If the service content and/or the corresponding texture data is stored and/or obtained after the current startup of the smart terminal and before the startup command for the target application is received, the service content can be obtained based at least in part on preferences, settings, historical or usage information, or user profile of the user. In some embodiments, a plurality of preferences, settings, historical or usage information, or user profile of the user is used in connection with obtaining the service content. In some embodiments, most recent (e.g., current) preferences, settings, historical or usage information, or user profile of the user is used in connection with obtaining the service content. As an example, as many as possible and/or the most recent one or more attributes of a user or one or more characteristics of a user are used to obtain the service content. Accordingly, the compatibility of the service content with respect to the one or more attributes of the user and/or the one more characteristics of the user is improved.

If the service content and/or the corresponding texture data is stored and/or obtained before the current startup (e.g., powering on and initializing) of the smart terminal, the obtaining of the service content is complete (e.g., ensured to be complete) before the startup command of the target application is obtained (e.g., invoked such as via launching the target application). In some embodiments, the storing and/or obtaining the service content and/or the corresponding texture data after the current startup of the smart terminal and before the startup command for the target application is received comprises storing and/or obtaining the service content and/or the corresponding texture data in response to the current startup of the smart terminal being complete, or during the current process of starting up the smart terminal.

In some embodiments, the preset texture format comprises: a preset compressed texture format. Compressing the texture (e.g., using a preset compressed texture format) can improve system bandwidth and system performance. For example, if the preset texture corresponds to a compressed texture format, the size of the corresponding texture data is smaller thereby conserving system bandwidth and increasing performance. In some embodiments, the preset compressed texture format comprises: Ericsson texture compression (ETC1), PowerVR texture compression (PVRTC), ATI texture compression (ATITC), or S3 texture compression (S3TC). The S3TC texture format can support a compression ratio of 6:1, such that, 6M of texture can be compressed into 1M for storage in the cache. Accordingly, cache utilization is improved (e.g., space cache resources are conserved). Other preset compressed texture formats or non-compressed preset texture formats can be implemented.

According to various embodiments, the texture data is provided to the graphics processing unit in connection with display of corresponding display content. For example, the obtaining the display content corresponding to the target service can comprise providing the texture data to the graphics processing unit. According to various embodiments, providing the texture data to the graphics processing unit comprises creating a context for the texture data based at least in part on a GPU type, and uploading the texture data context to a preset location corresponding to the GPU in accordance with a preset upload method. The preset upload method can correspond to a process for GPU uploading. The GPU uploading can correspond to sending texture data to the GPU buffer. For example, if the GPU type is ARM Mali (e.g., a type of GPUs produced by ARM Holdings), an ETC1 texture context can be created (e.g., a texture context configured according to the ETC1 texture format), and the texture context is uploaded to the preset location corresponding to the GPU in accordance with the preset upload method. The texture data can be provided to the graphics processing unit according to various other implemented processes.

According to various embodiments, in response to the application manager (AppManager) obtaining the startup command for the target application, a process for the target application is created, and process 100 is executed at least in part by the process corresponding to the target application. In some embodiments, process 100 is at least partially performed by the GPU (e.g., the GPU can be used in connection with obtaining the display content). As an example, the application manager can create the process for the target application. In some embodiments, the process corresponding to the target application asynchronously invokes a service processing module (e.g., a module that is configured to perform process 100). In response to the service processing module being invoked, the service processing module performs process 100 of FIG. 1. In connection with the process corresponding to the target application invoking the service processing module, the process corresponding to the target application executes a startup process of the target application (e.g., the process corresponding to the target application launches the target application).

The obtaining of the texture data of a target service can be implemented in various manners. Three examples of implementations of the obtaining the texture data are described below.

First Example Implementation for Obtaining Texture Data

According to a first example implementation for obtaining the texture data, the obtaining the texture data comprises matching characteristics of the target application with the characteristics of services stored, and using the matched service as the target service corresponding to the target application. Characteristics of applications can be matched with characteristics of services in advance (e.g., before the target application is launched). For example, a mapping of applications to services can be stored. The mapping of applications to services can be stored locally and/or remotely at a server. The mapping of applications to services can be determined based at least in part on a mapping of characteristics of applications to characteristics of services. As an example, a mapping of application types to services or types of services can be stored (e.g., locally and/or remotely). The mapping of application types to services or types of services can be used in connection with determining a service corresponding to the target application. Various other mappings can be implemented. During the starting up of the target application, target services that are matched to the target application can be provided (e.g., displayed) to the user. For example, in response to the target application being launched, the target service can be determined (e.g., based on the mapping of applications to services, etc.) and corresponding content can be obtained and provided to the user. Accordingly, the hit rate of the target service or corresponding content can be improved. For example, if the target application is the "Taobao application," the corresponding target services can be sales advertisements for soccer, clothing, or other products, or the corresponding target services can be Sale Day promotion advertisements. Accordingly, after the user views the target service, the corresponding shopping behavior can be generated. For example, the user can use the "Taobao app" to buy a product corresponding to the target service.

In some embodiments, the characteristics of the target application and the characteristics of the service respectively indicate the attributes of the target application and the service. As an example, the characteristics of the target application and/or the characteristics of the service comprise corresponding descriptive key words.

In some embodiments, the characteristics of the application comprise one or more of: an application type, an application tag, an application activity tag, usage information, etc. The application type can be used to indicate a type or a category to which the application belongs. For example, the application types can comprise a game type, an e-commerce type, a video type, an audio type, a social media type, etc. An application tag can be used to indicate the specific types of the target application. As an example, the application tag can be used to indicate a more specific purpose or category of the application (e.g., in contrast to the application type). For example, although the "Taobao application" and the "JD application" both belong to an e-commerce type of application, the application tags for the "Taobao application" and the "JD application" can be more specific. As an example, the application tags for the "Taobao application" comprise: "customer to customer," "consumer goods," and/or "online shopping"; and the application tags for the "JD application" comprise: "business to customer," "consumer goods," and/or "online shopping." Accordingly, applications having a same application type can be differentiated with respect to application tags. As another example, an application tag can correspond to a movie tag or a sports tag, and an application activity tag can correspond to how many times the application was active in a certain time.

In some embodiments, application activity tags can be used to indicate activities corresponding to the application. For example, e-commerce type applications have corresponding promotional activities, such as November Sale Day activities, December Sale Day activities, June 1st activities, etc. Application activity tags can have time attributes. For example, a time attribute of a November Sale Day activity could be "November 11." The application activity tag can be used to identify events on certain dates or times for corresponding applications.

According to various embodiments, the application types, application tags, and/or application activity tags are configured (e.g., defined) by the application developer, the application operator, an administrator, the user of the terminal, etc. In some embodiments, the application types, application tags, and/or application activity tags are obtained and/or updated based on client feedback. For example, the client accepts an application tag submitted by a user with respect to a certain application.

In some embodiments, the usage information comprised in the characteristics of the application indicates information pertaining to usage of the application by the user. The usage information can indirectly reflect the degree to which the user likes the application. In some embodiments, usage information comprises: usage frequency and/or usage time. As an example, a relatively higher usage frequency of an application is indicative of a higher degree of user preference for the application. Conversely, a relatively lower usage frequency of the application can be indicative of a lesser degree of user preference for the application. As another example, a last usage time that is more recent demonstrates a more current preference of the application by the user. In some embodiments, the usage information comprises information pertaining to a use of one or more specific features of the application by the user. Other information pertaining to usage of the application can be comprised in the usage information.

In some embodiments, the characteristics of a service are provided by the service provider. In some embodiments, the characteristics of the service are obtained in connection with analyzing service content. For example, a server can analyze the service content to determine the characteristics of the service. As another example, user feedback associated with the service content can be used in connection with determining (or setting) the characteristics of the service. According to various embodiments, the characteristics of the service comprise information pertaining to a subject of the service, a content of the service, a type of service, etc. For example, the characteristics of a service content for "Nike soccer ad 1" comprise: "Nike," "soccer," and "sale." Various other information pertaining to the service can be comprised in the characteristics of the service.

According to various embodiments, the characteristics of the target application are matched against the characteristics of the services and stored in advance. For example, a mapping of applications to services and/or a mapping of characteristics of the applications to characteristics of the services is stored. Match rates for matches between target applications and services can be obtained. For example, a match rate satisfying a preset match rate condition (e.g., a match rate exceeding a preset match threshold) is indicative of a matching success. Conversely, a match rate that does not satisfy a preset match rate condition (e.g., a match rate not exceeding a preset match threshold) is indicative of a matching failure. As an example, the preset match rate condition comprises: a match rate greater than a matching threshold. The matching threshold can be a numerical value greater than a preset percent (e.g., 85%). The preset match rate condition can be set by the service provider, an advertiser, etc. As an example, if the target application is the "Taobao application" and the application type of the "Taobao application" is e-commerce, the application tags of the "Taobao application" comprise "customer to customer," "consumer goods," and "online shopping"; and if characteristics of the service corresponding to "Nike soccer ad 1" comprise: "Nike," "soccer," and "sale," then, if the match rates of "sale" to e-commerce and "online shopping" are both relatively high, the "Nike soccer ad 1" can therefore be determined to be a service (e.g., an advertisement) that is successfully matched to the "Taobao application." A matching threshold can be set based at least in part on historical information. For example, the historical information can comprise historical information pertaining to a user's historical use or habits.

The first implementation for obtaining texture data has the following advantages:

First, target services that match the target application can be provided (e.g., displayed) to the user during the starting up of the target application, thus enabling an increase in the hit rate of the service placement (e.g., a hit rate of the content displayed to the user). For example, if a smart terminal of the user does not have e-commerce type applications installed, online shopping type advertisements can be avoided from being provided to the user (e.g., the terminal can determine via the matching of applications to services that no services that would otherwise match to an e-commerce type application match the applications installed on the terminal).

Second, the service placement businesses' placement of corresponding startup services corresponds to the user's characteristics. As an example, a suitable advertisement is provided to the user. As another example, targeting e-commerce type applications for the placement of advertisements that correspond to November Sale Day activities can improve the hit rate (e.g., ensure a relatively higher hit rate) of the service placement (e.g., the advertisement or other service content provided). As another example, using usage information such as an indication of low-frequency applications that reflect the preferences, low-frequency applications can provide value from a service perspective, enabling low-frequency applications to generate additional income. The low-frequency applications can be enabled to generate additional income because if the developer or vendor for the low-frequency applications is required to implement advertises by itself, the developer or vendor expends resources an effort to obtain the advertiser and/or corresponding advertisement and implement the advertisement. Such effort by the developer or vendor to obtain and implement advertisement in the low-frequency applications can generally exceed income derived from the advertising in the low-frequency applications. In contrast, according to various embodiments, the advertisements are selected and provided to a user in the low-frequency applications for the developer or vendor of the low-frequency applications. The developer or vendor of the low-frequency applications can receive a part of collected advertisement fees. In addition, various embodiments can more precisely push advertisements and obtain a better advertise effect than the developer or vendor of the low-frequency applications could feasibly do itself.

Second Example Implementation for Obtaining Texture Data

According to a second example implementation for obtaining the texture data, the obtaining the texture data comprises using the application manager to retrieve storage path information of the texture data of the target service corresponding to the target application, and based on the storage path information, read the texture data of the target service corresponding to the target application. The storage path information of the texture data can be obtained from a server or an operating system (e.g. of the terminal). As an example, a mapping of storage paths to services is stored. The mapping of storage paths to services can be stored locally (e.g., at the terminal) or remotely (e.g., at a server).

In some embodiments, the application manager (AppManager) is installed on the smart terminal and used in connection with performing dynamic management of the applications on the smart terminal. The dynamic management can comprise installation, uninstallation, startup, and stoppage.

According to various embodiments, in response to the application manager receiving the startup command for the target application, the application manager can obtain the target service corresponding to the target application, obtain the storage path information for the texture data of the target service, and provide the storage path information to a process of the target application. In response to the process of the target application obtaining the storage path information, the process of the target application obtains (e.g., reads) the texture data of the target service corresponding to the target application based at least in part on the storage path information.

Third Example Implementation for Obtaining Texture Data

According to a third example implementation for obtaining the texture data, the obtaining the texture data comprises, after the obtaining of the startup command with respect to the target application, the application manager queries a matching of the characteristics of the target application to the characteristics of the services stored in advance (e.g., a mapping of applications to services, etc.), and determines a target service corresponding to the target application (e.g., a service that matches the target application based on the mapping of services to applications). The application manager obtains the storage path information of the target service, and provides the storage path information to the process of the target application. The storage path information of the texture data can be obtained from a server or an operating system (e.g. of the terminal). As an example, a mapping of storage paths to services is stored. The mapping of storage paths to services can be stored locally (e.g., at the terminal) or remotely (e.g., at a server). In response to obtaining the storage path information, the process of the target application asynchronously invokes the service processing module, and provides the storage path information of the target service to the service processing module. In some embodiments, the service processing module corresponds to an advertisement server. In response to obtaining the storage path information of the target service, the service processing module obtains the texture data of the target service corresponding to the target application based at least in part on the storage path information. In some embodiments, the texture data conforms to a preset texture format. For example, the texture format conforms to a preset texture format that the application processor is configured to process (e.g., configured to obtain information or otherwise recognize the information).

In addition to the foregoing implementations for obtaining texture data of the target service, the texture data of the target service corresponding to the target application can be obtained from the service content stored in advance according to various other different implementations. In some embodiments, a target service is randomly selected from among the services stored in advance. In some embodiments, a target service is randomly selected from among the services stored in advance based at least in part on a frequency by which content for the respective services is displayed. For example, a priority can be given to the selection of services with a low placement frequency (e.g., a service for which corresponding content is displayed at a low frequency). The use of a frequency by which content for the respective services is displayed as a basis for selecting (or determining) a target service can improve the uniformity of service placement. In some embodiments, the target service is selected based at least in part on a hit rate associated with content corresponding to the target service. For example, the hit rate can be an indicator of a frequency by which users select the content (e.g., click on an advertisement, input a search relating to the content displayed to the user, purchase an item relating to the content displayed to the user, etc.).

In some embodiments, in connection with providing the display content, the terminal can be redirected in response to a user input. For example, in response to a user input with respect to display content (e.g., selection of the display content, a user click on the display content), the target application can jump (e.g., redirect) from the current page to a preset jump page. In some embodiments, in response to a user input with respect to display content, another application can be launched and corresponding information is provided. For example, in response to a user input with respect to display content, a browser application is launched and a web page associated with the displayed content is displayed. The preset jump page can be related to the subject of the target service. For example, if the subject of the target service is a product, the preset jump page can be a page corresponding to the product. As another example, if the subject of the target service is associated with public welfare, the preset jump page can be the page of the public welfare organization. Various embodiments do not limit the specific jump page.

In some embodiments, in response to a user input with respect to the display content, display of the display content corresponding to the target service is stopped. In addition, in response to a user input with respect to the display content, the startup processing of the target application is stopped (e.g., another application can be launched and corresponding information can be provided). The processing of the target application can comprise: obtaining the interface content of the application (e.g., in order to provide content for the startup interface of the target application), and caching the interface content. In some embodiments, in response to obtaining a command to start up the target application, the startup processing of the target application is resumed (e.g., in response to receiving an input from the user to start up the target application). In some embodiments, in response to obtaining a back command (e.g., from a user) with respect to the jump page, the providing of the display content corresponding to the target service and the startup processing of the target application are resumed. For example, if in response to a user input with respect to the display content, the startup processing of the target application is stopped and information associated with the display content is stopped being displayed to the user, then in response to a back command (e.g., input by a user), the terminal resumes displaying the display content and startup processing of the target application.

Various embodiments prepare (e.g., determine, generate, etc.) texture data that conforms to a preset texture format before the startup command of the target application. Accordingly, retrieval speed of service display content is improved, and the display time of the service content can be provided sooner.

In some embodiments, retrieval speed of the service display content is improved and the display time of the service content can be provided sooner (e.g., in relation to when a startup command is input) because service content decoding processing is not performed during the startup process of the target application. In some embodiments, the texture data is provided to the graphics processing unit to perform rendering processing to obtain the corresponding service display content. Accordingly, the corresponding decoding processing time is saved during the process of starting up the application.

Various embodiments conserve the memory required for decoding processing that is otherwise required in conventional implementations, thus reducing the peak memory of the smart terminal. For example, because the texture data can be pre-stored, the terminal does not process the service content to generate the texture data and thus memory that would be used in the processing of the service content to generate the texture data is saved.

Figure 2:
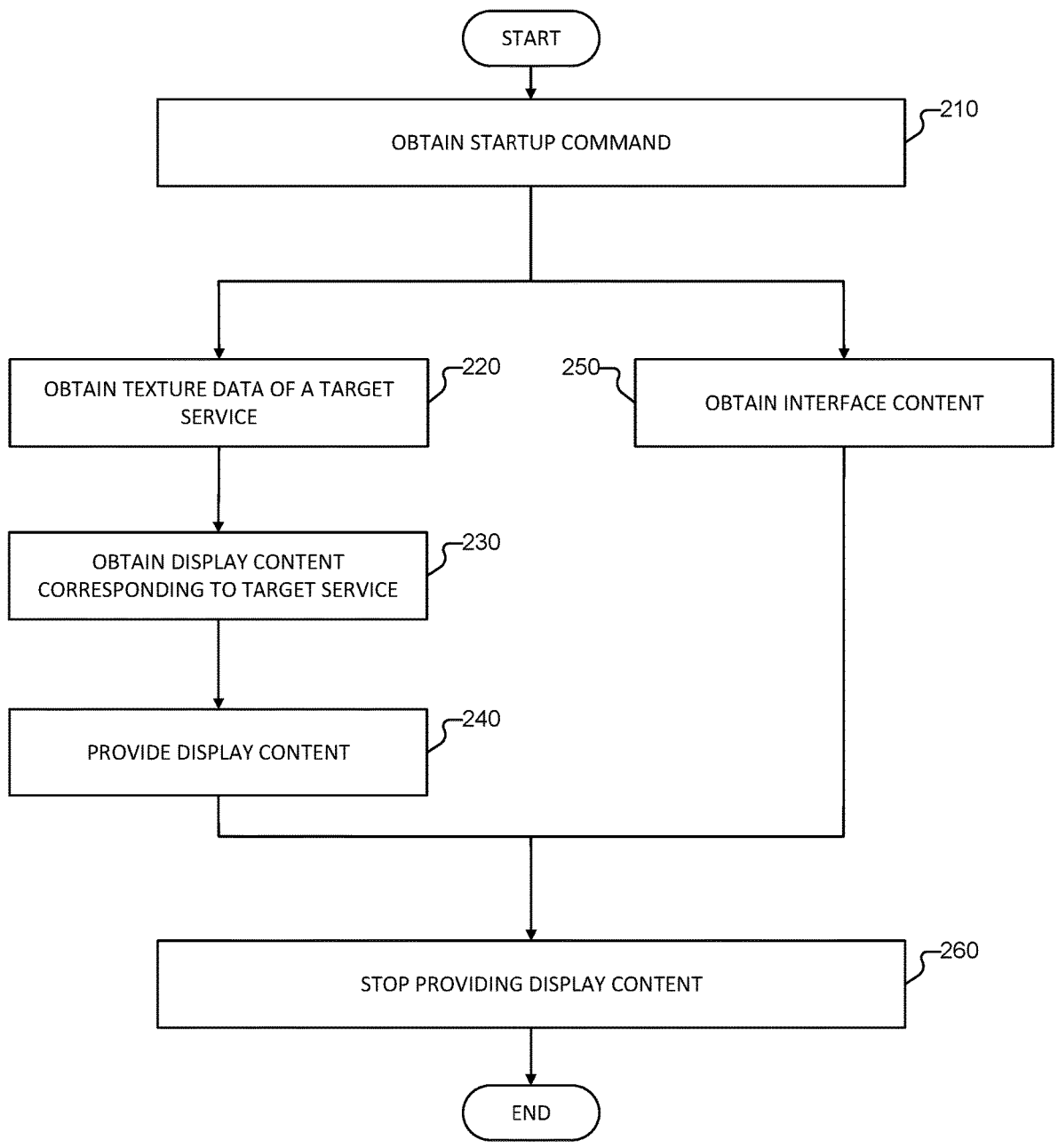
FIG. 2 is a flowchart of a method for processing a service according to various embodiments of the present application.

FIG. 2 is a flowchart of a method for processing a service according to various embodiments of the present application.

Referring to FIG. 2, process 200 is provided. Process 200 can be implemented in connection with process 100 of FIG. 1, process 300 of FIG. 3, process 400 of FIG. 4, and/or process 600 of FIG. 6. Process 200 can be implemented in connection with system 500 of FIG. 5. Process 200 can be implemented at least in part by system 700 of FIG. 7.

At 210, a startup command is obtained. In some embodiments, the startup command is obtained in response to a user input. For example, a user input to the terminal can invoke a startup command. The startup command can correspond to a command to start up (e.g., execute or launch) an application. In response to receiving a user input (e.g., selection of an icon corresponding to an application, selection of a hyperlink, etc.), the startup command is obtained. In some embodiments, the startup command is obtained in connection with a processing of another application. For example, during processing of an application, the application can determine to start up the target application. Accordingly, the application invokes a startup command with respect to the target application.

At 220, texture data of a target service is obtained. In some embodiments, the target service is obtained in connection with the startup (e.g., launch) of an application (e.g., the target application). For example, in response to receiving a startup command for the target application, texture data of the target service corresponding to the target application is obtained. In some embodiments, the startup command is obtained in connection with a user input to the terminal such as selection of an icon corresponding to the application, etc. In some embodiments, the startup command is obtained in response to a process or application invoking the application based at least in part on one or more conditions being satisfied (e.g., a context of the terminal, in response to a function of an application being performed, etc.). The texture data of the target service corresponding to the target application can be obtained from service content stored in advance. In some embodiments, the terminal obtains the texture data from a local storage. In some embodiments, the terminal obtains the texture data from a server. In some embodiments, the texture data is stored in a predefined format on the server. As an example, the texture data can be stored at an advertisement server, and the terminal can obtain the texture data from the advertisement server in response to the application being launched. In some embodiments, the target service corresponds to an advertisement service. The texture data can correspond to advertising content. In some embodiments, the texture data is configured based at least in part on a preset texture format. As an example, the texture data is configured according to a preset texture format that the graphics processing unit is configured to recognize. According to various embodiments, the texture data can be obtained from texture data stored in a predefined format on the terminal (e.g., on the operating system, etc.), or if the texture data is not locally available, the texture data is obtained from a server.

At 230, display content corresponding to the target service is obtained. In some embodiments, the display content corresponding to the target service is obtained based at least in part on the texture data of the target service. The graphics processing unit can process the texture data to obtain the display content corresponding to the target service. The display content can correspond to service content such as advertisement content. The display content can comprise an image, a video, etc.

At 240, display content is provided. In some embodiments, the display content corresponding to the target service is displayed on a display unit of the smart terminal. The display content can be displayed during startup of the application.

At 250, interface content is obtained. In some embodiments, the interface content is obtained in response to obtaining the startup command (e.g., the startup command for the target application). In some embodiments, the interface content is content with respect to the target application. For example, the interface content comprises information that is provided by the target application. The interface content can comprise one or more of a graphical user interface corresponding to the target application, and information provided in the graphical user interface corresponding to the target application.

According to various embodiments, the interface content is obtained contemporaneously with 220, 230, and/or 240 of process 200 of FIG. 2. For example, 250 is performed in parallel with (e.g., at the same time as) 220, 230, and/or 240 of process 200 of FIG. 2.

At 260, the providing of the display content is stopped. In some embodiments, the providing of the display content is stopped in response to a determination that interface content conforms to one or more preset conditions. The preset conditions can correspond to completion of a processing of the interface content or a loading of the interface content. For example, in response to determining that the loading of the interface content is complete, the display of the display content is stopped. As an example, the display of the display content is stopped and the obtained interface content is displayed. In some embodiments, in response to determining that the target application is started up (e.g., that loading of the target application is complete), the interface content corresponding to the target application is displayed in place of the display content. As an example, display of the display content can be stopped in response to determining that application content is available for display (e.g., in response to determining that the application content is loaded, etc.).

According to various embodiments, in response to obtaining the startup command for the target application, the interface content of the target application is retrieved concurrently with the processing and/or display of the display content corresponding to the target service. The display content can provide content for the startup interface of the target application.

According to various embodiments, the obtaining of the interface content comprises: creating and initializing a rendering engine, obtaining a resource of the target application, and using this rendering engine to perform layout rendering and interface drawing of the resource of the target application. In some embodiments, the obtaining of the resource of the target application comprises performing a resource download based on a description file of the target application. For example, a description file of the target application can be obtained from a local storage. The interface content of the target application can be obtained according to various other implementations.

According to various embodiments, the providing of the display content is stopped in response to a determination that the interface content conforms to one or more preset conditions. The one or more preset conditions can comprise the dimensions of the interface content (e.g., the screen dimensions of the interface content exceed the screen dimensions of the smart terminal), a completion of the loading of the interface content, etc. In response to determining that the dimensions of the interface content exceed the screen dimensions of the smart terminal, the first screen can be deemed complete. The first screen can correspond to the interface content that is obtained. Accordingly, the display of the display content corresponding to the target service can be stopped, and the interface content can be provided. For example, the interface content can be displayed to the user.

Figure 3:
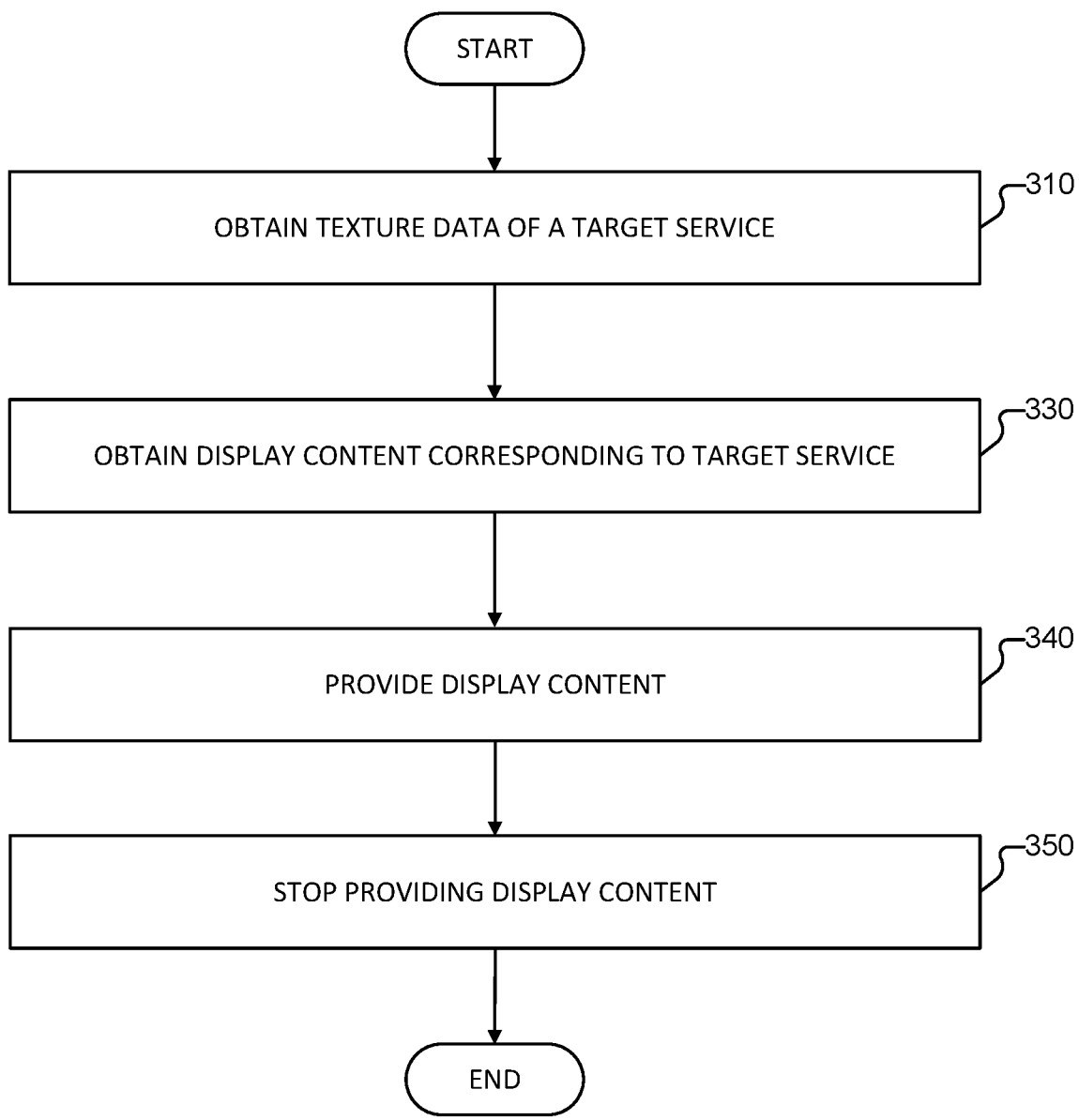
FIG. 3 is a flowchart of a method for processing a service according to various embodiments of the present application.

FIG. 3 is a flowchart of a method for processing a service according to various embodiments of the present application.

Referring to FIG. 3, process 300 is provided. Process 300 can be implemented in connection with process 100 of FIG. 1, process 200 of FIG. 2, process 400 of FIG. 4, and/or process 600 of FIG. 6. Process 300 can be implemented in connection with system 500 of FIG. 5. Process 300 can be implemented at least in part by system 700 of FIG. 7.

At 310, texture data of a target service is obtained. In some embodiments, the target service is obtained in connection with the startup (e.g., launch) of an application (e.g., the target application). For example, in response to receiving a startup command for the target application, texture data of the target service corresponding to the target application is obtained. In some embodiments, the startup command is obtained in connection with a user input to the terminal such as selection of an icon corresponding to the application, etc. In some embodiments, the startup command is obtained in response to a process or application invoking the application based at least in part on one or more conditions being satisfied (e.g., a context of the terminal, in response to a function of an application being performed, etc.). The texture data of the target service corresponding to the target application can be obtained from service content stored in advance. In some embodiments, the terminal obtains the texture data from a local storage. In some embodiments, the terminal obtains the texture data from a server. As an example, the texture data can be stored at an advertisement server, and the terminal can obtain the texture data from the advertisement server in response to the application being launched. In some embodiments, the target service corresponds to an advertisement service. The texture data can correspond to advertising content. In some embodiments, the texture data is configured based at least in part on a preset texture format. As an example, the texture data is configured according to a preset texture format that the graphics processing unit is configured to recognize.

At 330, display content corresponding to the target service is obtained. In some embodiments, the display content corresponding to the target service is obtained based at least in part on the texture data of the target service. The graphics processing unit can process the texture data to obtain the display content corresponding to the target service. The display content can correspond to service content such as advertisement content. The display content can comprise an image, a video, etc.

At 340, display content is provided. In some embodiments, the display content corresponding to the target service is displayed on a display unit of the smart terminal. The display content can be displayed during startup of the application.

At 350, the providing of display content is stopped. According to various embodiments, after the providing of the display content is stopped, the display content (e.g., corresponding to the target service) is provided to a service module and/or a service server. As an example, the display content is provided to the service module and/or service server in response to the display of the display content being stopped.

According to various embodiments, the presentation information corresponding to the display content is provided to the service module and/or service server. For example, the display content (or presentation information corresponding to the display content) is provided to the service module and/or service server in connection with enabling the service module to upload the display content (e.g., the presentation information of the display content) corresponding to services already displayed to the service server. In some embodiments, the service server performs processing on the display content (e.g., the presentation information of the display content). For example, the processing performed by the service server with respect to the display content comprises billing processing of services already placed (e.g., billing for the display of display content with respect to a target service), calculation of placement frequency for services already placed (e.g., for the display of display content with respect to a target service), etc. According to various embodiments, the service module indicates the module in the smart terminal used to download, decompress, and/or manage service content. In some embodiments, the service module is configured to communicate with the service server.

According to various embodiments, the presentation information corresponding to the display content comprises one or more of the presentation duration (e.g., a length of time that the display content is displayed), the number of presentations (e.g., a number of times display content is displayed such as a specific piece of display content), a number of clicks (e.g., a number of times the display content is selected, such as a click through rate, etc.), an identifier that identifies the display content, etc. As an example, the number of clicks can correspond to the click operations with respect to the display content. Various other types of presentation information can be implemented.

Figure 4:
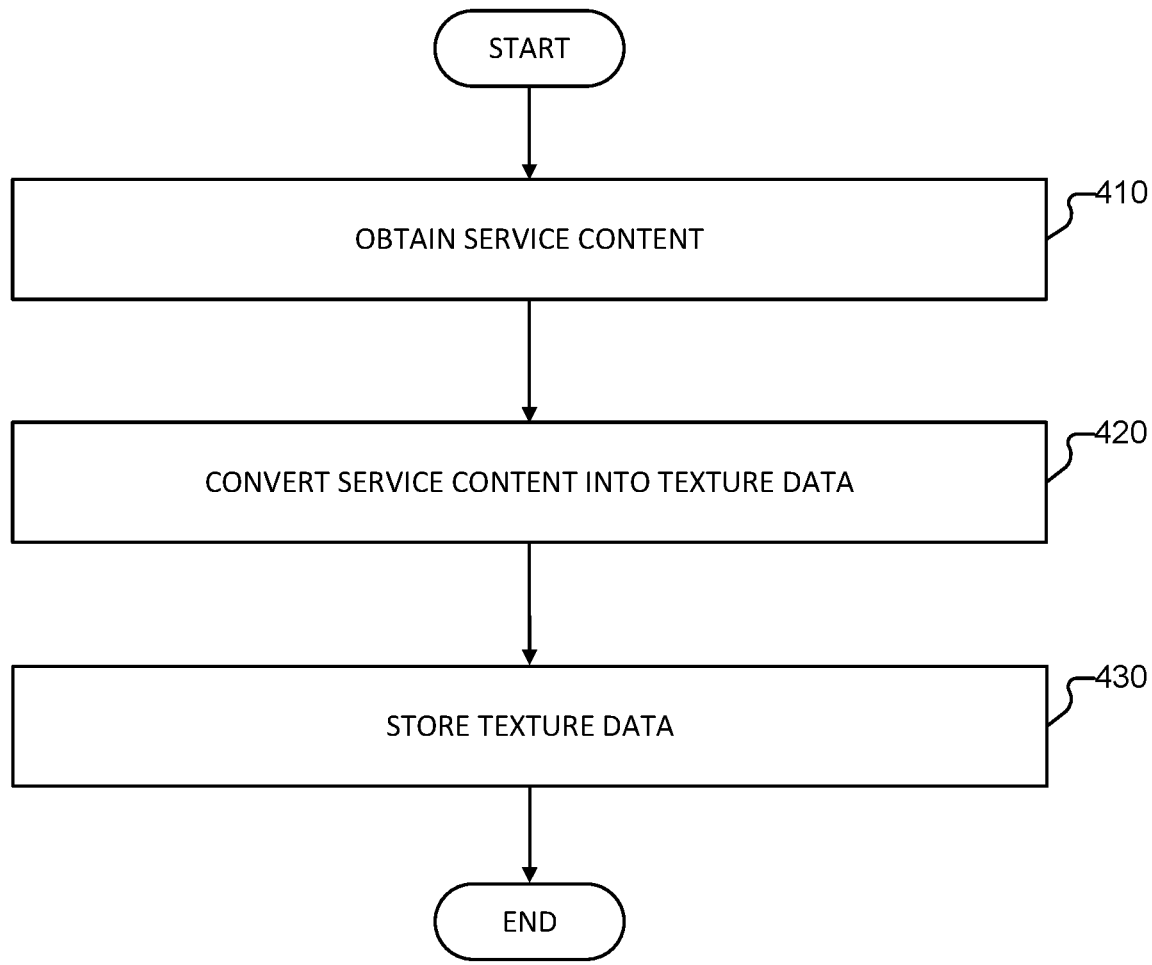
FIG. 4 is a flowchart of a method for processing a service according to various embodiments of the present application.

FIG. 4 is a flowchart of a method for processing a service according to various embodiments of the present application.

Referring to FIG. 4, process 400 is provided. Process 400 can be implemented in connection with process 100 of FIG. 1, process 200 of FIG. 2, process 300 of FIG. 3, and/or process 600 of FIG. 6. Process 400 can be implemented in connection with system 500 of FIG. 5. Process 400 can be implemented at least in part by system 700 of FIG. 7.

At 410, service content is obtained. According to various embodiments, the service content is obtained from a server. For example, the terminal can obtain service content from the server via one or more networks. The server can be an advertisement server (e.g., a server that provides content pertaining to advertisements). The terminal can query the server for the service content based at least in part on one or more applications installed on the terminal, or preferences, settings, historical or usage information, or user profile of the user, etc.

In some embodiments, the terminal periodically obtains the service content. For example, the terminal obtains the service content from the server based at least in part on one or more preset time periods. In some embodiments, the terminal obtains the service content according to one or more conditions being satisfied. For example, in response to a determination that the terminal has less than a threshold amount of service content stored locally, the terminal obtains service content from the server. As another example, in response to a determination that less than a threshold amount of locally stored service content has not yet been used in connection with displaying display content, the terminal obtains service content from the server. The terminal can obtain service content on an application-by-application basis, a service content type-by-service content type basis, etc. For example, in response to the terminal determining that no service content corresponding to an application is stored locally (or less than a threshold amount of service content corresponding to the application is stored locally), the terminal obtains service content corresponding to the application from the server.

According to various embodiments, the service content is obtained from a local storage of the terminal. The service content can correspond to one or more applications.

At 420, texture data is obtained based at least in part on the service content. According to various embodiments, the service content is converted into texture data. For example, the terminal processes the service content in connection with determining (e.g., obtaining, generating, etc.) the texture data. According to various embodiments, the texture data conforms to a preset texture format.

According to various embodiments, the texture data is obtained before a startup command with respect to an application is obtained. For example, the texture data is obtained in advance of a target application being launched (e.g., before a user inputs a request to launch the application). According to various embodiments, the texture data is obtained independent of a launching of an application. For example, the terminal processes the service content in connection with obtaining (e.g., generating) the texture data independent of whether a startup command is obtained and/or independent of the launching of the application. The texture data can be obtained based at least in part on one or more predefined periods of time.

At 430, texture data is stored. According to various embodiments, the texture data is stored locally at the terminal. The texture data can be stored in advance of an application (e.g., the application corresponding to the target service to which the texture data corresponds) being launched. According to various embodiments, the texture data is stored independent of a launching of an application.

According to various embodiments, because texture data that conforms to a preset texture format is obtained (e.g., generated, determined, etc.) in advance (of the corresponding application being launched), the retrieval time of service display content is improved. Accordingly, the display time of the service content is improved (e.g., the service content is displayed sooner).

In some embodiments, the service content is obtained before the current startup of the smart terminal. In some embodiments, the service content is obtained after the current startup of the smart terminal and before the startup command for the target application is received. Various retrieval timings for obtaining service content can be implemented. For example, the obtaining of the service content after the current startup of the smart terminal and before the startup command for the target application is received comprises: obtaining the service content in response to a determination that the current startup of the smart terminal is complete, or obtaining the service content during the current process of starting up the smart terminal.

According to various embodiments, the service content is obtained based at least in part on the personalization characteristics of a user, or preferences, settings, historical or usage information, or user profile of the user, etc. The obtaining of the service content based at least in part on the personalization characteristics of a user, or preferences, settings, historical or usage information, or user profile of the user, etc. can improve the compatibility of the service content with the user (e.g., the service content provided to the user can be more personalized, etc.). The service content provided to a user can be of more interest to the user, and the hit rate of the corresponding display content (or service content) can be increased.

According to various embodiments, the personalization characteristics of a user, or preferences, settings, historical or usage information, or user profile of the user, etc. comprises characteristics obtained based on the historical behavior data associated with the user; and/or, characteristics obtained based on the characteristics of applications installed on the smart terminal.

The historical behavior of the user (e.g., corresponding to the historical behavior data associated with the user) can be any behavior of the user made via the smart terminal. For example, the historical behavior comprises one or more of a webpage browsing behavior, a webpage search behavior, a product purchase behavior, an internet content publishing behavior, interactive behavior (e.g., bookmarking actions, liking actions, and commenting actions), etc. The historical behavior data of the user can be obtained based on an identifier associated with the user, a file corresponding to a user operating the terminal (e.g., a profile of the user), etc. In some embodiments, the historical behavior data of a user is obtained based on the identifier of the smart terminal associated with the user. According to various embodiments, the corresponding personalization characteristics are obtained by analyzing the historical behavior data of the user. The personalization characteristics can comprise one or more of attributes of the user, preferences of the user, etc. Various other personalization characteristics and/or historical behavior data can be implemented (e.g., in connection with obtaining the service content).

In some embodiments, a user installs applications on the smart terminal and/or the user uses installed applications on smart terminals for personal use. Accordingly, the installation and/or use of an application installed on a smart terminal can be indicative of behavioral requirements or preferences of the user. For example, users typically install e-commerce type applications for online shopping. For another example, users often install chess game applications for entertainment and games. The characteristics of applications installed on the smart terminal can therefore be considered to reflect the preferences of the user. According to various embodiments, the personalization characteristics are obtained based on the first characteristics of applications installed on the smart terminal. The personalization characteristics can be used in connection with the obtaining of service content and/or the displaying of display content corresponding to the service content or otherwise the providing of the service content. The use of the personalization characteristic in connection with obtaining the service content and/or providing the display content can increase the hit rate corresponding to the service content. For example, if the smart terminal of a user has no e-commerce type applications installed thereon, providing online shopping type services to the user can be avoided. In addition, the use of the personalization characteristic in connection with obtaining the service content and/or providing the display content can also make low-frequency applications (e.g., applications that are used relatively infrequently) have service operating value, and thus additional income can be obtained with respect to the low-frequency applications. For example, if a parent-child type application is included among the installed applications for a user in order to satisfy the user requirement or preference to record child-rearing information, but the usage frequency of this parent-child type application by the user is relatively low, nevertheless, placing services that correspond to the parent-child type during the process of the user starting up this parent-child type application can still ensure the hit rate of service placement.

In some embodiments, the characteristics of applications installed on the smart terminal can be used as the personalization characteristics of the user, or the characteristics of applications installed on the smart terminal are processed to obtain the personalization characteristics of the user. According to various embodiments, the processing of the characteristics of the applications comprises: deduplication processing or expansion processing. The deduplication processing can eliminate key words with duplicated meanings. The expansion processing can expand the key words corresponding to the first characteristics in order to obtain corresponding synonyms. Various implementations for obtaining personalization characteristics based on the applications installed on the smart terminal are possible.

According to various embodiments, the service content is obtained based at least in part on personalization characteristics of a user, or preferences, settings, historical or usage information, or user profile of the user, etc. The service content can be obtained from a server (e.g., the service server) based at least in part on the personalization characteristics of a user, or preferences, settings, historical or usage information, or user profile of the user, etc. As an example, the terminal queries the server for the service content based at least in part on personalization characteristics of a user, or preferences, settings, historical or usage information, or user profile of the user, etc. For example, the personalization characteristics of a user, or preferences, settings, historical or usage information, or user profile of the user, etc. can be provided to the service server, and the corresponding service content can be obtained from the service server.

In some embodiments, process 400 of FIG. 4 is implemented by a service module. The service module can be software code configured to download, decompress, and manage service content. The service module can communicate with a server (e.g., the service server) in connection with obtaining the service content and the process service content to obtain texture data that conforms to a preset format. In some embodiments, the service module is configured to, before the startup command for the target application is received, start up and provide service content for the corresponding target service to the target application.

The obtaining of the service content can be implemented in various manners. Three examples of implementations of the obtaining of the service content are described below.

First Example Implementation for Obtaining Service Content

According to a first example implementation for obtaining the service content, the obtaining the service content comprises: matching the personalization characteristics of a user, or preferences, settings, historical or usage information, or user profile of the user, etc. (or information associated therewith) to the second of the services and retrieving the corresponding service content to determine a successfully matched service. For example, a mapping of personalization characteristics of a user, or preferences, settings, historical or usage information, or user profile of the user, etc. to services can be stored. The mapping of personalization characteristics of a user, or preferences, settings, historical or usage information, or user profile of the user, etc. to services can be stored locally and/or remotely at a server. The mapping of personalization characteristics of a user, or preferences, settings, historical or usage information, or user profile of the user, etc. to services can be determined based at least in part on a mapping of characteristics pertaining to a user to characteristics of services. As an example, a mapping of user attributes to services or types of services can be stored (e.g., locally and/or remotely). As another example, a mapping of historical information (e.g., usage information) to services or types of services can be stored. The mapping of personalization characteristics of a user, or preferences, settings, historical or usage information, or user profile of the user, etc. to services or types of services can be used in connection with determining a service corresponding to the user. Various other mappings can be implemented.

According to various embodiments, the personalization characteristics of a user, or preferences, settings, historical or usage information, or user profile of the user, etc. are matched against the characteristics of the services to obtain (e.g., determine) corresponding match rates. A match rate can be indicative of an extent to which a service matches to a user or information pertaining to a user. A match can be determined to be successful in response to a determination that the match rate between a service and a user or information pertaining to the user conforms to preset match rate conditions (e.g., a measure of an extent of a match exceeds a predefined match threshold, a quantity of attributes pertaining to the user that matches to a service exceeds a predefined match attribute threshold, etc.). Various other preset match rate conditions can be implemented.

According to various embodiments, one or more key words correspond to the personalization characteristics of a user, or preferences, settings, historical or usage information, or user profile of the user, etc. For example, one or more keywords can be determined based at least in part on the personalization characteristics of a user, or preferences, settings, historical or usage information, or user profile of the user, etc. In some embodiments, the one or more key words are mapped to one or more services. A mapping of keywords to services can be stored. In some embodiments, the number of services matched to each key word is one or more. In some embodiments, the service corresponding to the user can be determined based at least in part by determining the one or more keywords corresponding to the personalization characteristics of a user, or preferences, settings, historical or usage information, or user profile of the user, etc., and determining the one or more services corresponding to the one or more keywords (e.g., by querying a mapping of keywords to services).

According to various embodiments, the service content is updated based on continually changing personalization characteristics. The service content can be updated periodically and/or in response to a change to personalization characteristics of a user, or preferences, settings, historical or usage information, or user profile of the user, etc. As an example, in response to personalization characteristic 1 being added, service content corresponding to personalization characteristic 1 is obtained. As another example, in response to personalization characteristic 2 being deleted, the corresponding service content is deleted from the retrieved service content.

Second Example Implementation for Obtaining
Service Content

According to a second example implementation for obtaining the service content, the obtaining of the service content comprises: obtaining the corresponding service content based at least in part on a sequence of priorities corresponding to one or more of personalization characteristics of a user, or preferences, settings, historical or usage information, or user profile of the user, etc. According to various embodiments, the relative priorities can be set based at least in part on an extent to which service content matches the personalization characteristics of a user, or preferences, settings, historical or usage information, or user profile of the user, etc. For example, the service content that more highly matches the personalization characteristics of a user, or preferences, settings, historical or usage information, or user profile of the user, etc. is deemed higher priority than service content that does not as highly match the personalization characteristics of a user, or preferences, settings, historical or usage information, or user profile of the user, etc.

In some embodiments, service content that corresponds to high-priority of personalization characteristics of a user, or preferences, settings, historical or usage information, or user profile of the user, etc., is prioritized. The obtained service content is converted into texture data and stored in advance (e.g., in accordance with the 420 and 430 of process 400 of FIG. 4). The service content can be converted to the texture data according to a priority level associated with the service content. For example, service content associated with a relatively higher priority is converted to texture data before service content associated with a relatively lower priority is converted to texture data. As another example, service content associated with a relatively higher priority is obtained before service content associated with a relatively lower priority is obtained. In some embodiments, service content corresponding to the personalization characteristics of a user, or preferences, settings, historical or usage information, or user profile of the user, etc. is retrieved without distinguishing priority levels, because the terminal generally stores a quantity of service content that corresponds to high-priority personalization characteristics of a user, or preferences, settings, historical or usage information, or user profile of the user, etc. that is relatively small in relation to a quantity of all service content stored. According to various embodiments, the service content preparation speed is improved, thereby increasing the retrieval speed of the display content of the target service corresponding to the target application after the startup command for the target application is received.

According to various embodiments, characteristics of an application comprise one or more of: an application type, an application tag, an application activity tag, and usage information. The sequence of priorities corresponding to the personalization characteristics of a user, or preferences, settings, historical or usage information, or user profile of the user, etc. can successively comprise: the personalization characteristics or the like that correspond to the application activity tags, the personalization characteristics or the like that correspond to the application tags, and the personalization characteristics or the like that correspond to the application type.

Because the timeliness of the preference requirements reflected by application activity tags is typically relatively strong, priority can therefore be given to retrieving corresponding service content targeting personalization characteristics that correspond to the application activity tags. Because the precision of the preference requirements reflected by application tags is typically higher than the precision of the preference requirements reflected by application types, the priority level of personalization characteristics that correspond to application tags can be higher than the priority level of personalization characteristics that correspond to the application type.

The sequence of priorities of the aforementioned personalization characteristics that correspond to the application activity tags, personalization characteristics that correspond to the application tags, and personalization characteristics that correspond to said application types are merely non-limiting examples. Various priorities of personalization characteristics of a user, or preferences, settings, historical or usage information, or user profile of the user, etc. can be implemented. For example, personalization characteristics of a user, or preferences, settings, historical or usage information, or user profile of the user, etc. with stronger timeliness or a higher degree of matching to preference requirements can be determined as high-priority.

According to various embodiments, after the completion of obtaining the service content corresponding to relatively higher-priority personalization characteristics of a user, or preferences, settings, historical or usage information, or user profile of the user, etc., the obtaining the service content retrieval is deemed complete. For example, the terminal does not obtain service content corresponding to low-priority personalization characteristics of a user, or preferences, settings, historical or usage information, or user profile of the user, etc. if the terminal has service content corresponding to relatively higher priority personalization characteristics of a user, or preferences, settings, historical or usage information, or user profile of the user, etc. Accordingly, the bandwidth of the smart terminal is conserved. In some embodiments, after the completion of the obtaining of service content corresponding to high-priority personalization characteristics of a user, or preferences, settings, historical or usage information, or user profile of the user, etc., the obtaining of service content corresponding to lower-priority personalization characteristics of a user, or preferences, settings, historical or usage information, or user profile of the user, etc., can proceed successively. Various embodiments do not limit the specific process of retrieving the corresponding service content based on the sequence of priorities corresponding to the personalization characteristics of a user, or preferences, settings, historical or usage information, or user profile of the user, etc.

Third Example Implementation for Obtaining
Service Content

According to a third example implementation for obtaining the service content, the obtaining of the service content comprises: the service module obtaining the advertisement configuration information from an advertising server. The advertisement configuration information includes the characteristics of an advertisement. As an example, the service module obtains the characteristics of installed applications from the application manager. The service module can determine a service content matching personalization characteristics of a user, or preferences, settings, historical or usage information, or user profile of the user, etc. based on the aforementioned characteristics of the applications installed on the terminal. For example, the service module can determine the service content corresponding to the target application based at least in part on a mapping of characteristics of the application to characteristics of the service or service content and/or characteristics of the advertisement. In response to determining the service content, the corresponding service content for the successfully matched advertisement is obtained.

In some embodiments, the converting the service content into texture data comprises generating a texture assembler and converting the service content into corresponding texture data based at least in part on (e.g., using) the texture assembler. Various other conversion techniques can be implemented.

Because texture data that conforms to a preset texture format is prepared (e.g., generated) in advance, the retrieval speed of the service display content is improved (e.g., in contrast to conventional techniques), thereby displaying the service content sooner.

Various embodiments obtain the corresponding service content based at least in part on the personalization characteristics of a user, or preferences, settings, historical or usage information, or user profile of the user, etc. Accordingly, compatibility of the service content with the user can be improved. Service content of interest can be provided to the user with greater accuracy, thereby increasing the hit rate of service content (e.g., the display content).

Figure 5:
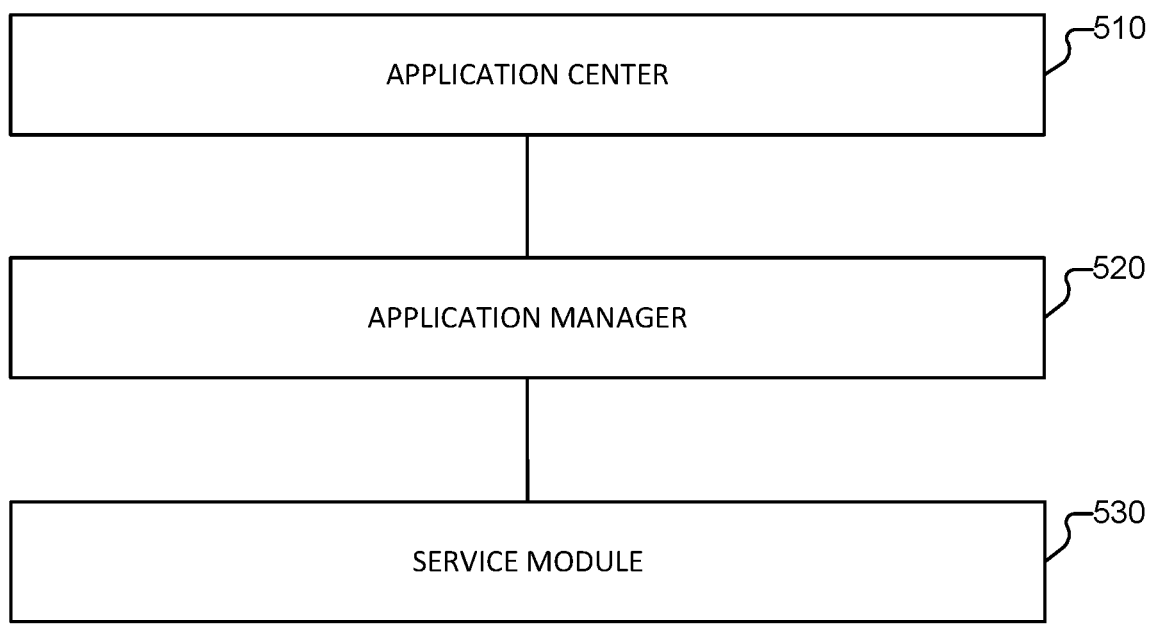
FIG. 5 is a structural schematic diagram of a service processing system according to various embodiments of the present application.

FIG. 5 is a structural schematic diagram of a service processing system according to various embodiments of the present application.

Referring to FIG. 5, system 500 is provided. System 500 can implement at least part of process 100 of FIG. 1, process 200 of FIG. 2, process 300 of FIG. 3, process 400 of FIG. 4, and/or process 600 of FIG. 6. System 500 can be implemented at least in part by system 700 of FIG. 7.

System 500 comprises application center 510, application manager 520, and/or service module 530.

Application center 510 can be configured to maintain applications and the information of applications (hereinafter referred to as application information). Application information can be used to identify applications. As an example, application information includes one or more of application identifiers and application types. The application information can be used in connection with determining or identifying characteristics of the application (e.g., used in connection with the obtaining of target services corresponding to the target application), and/or in connection with determining or identifying the personalization characteristics of a user, or preferences, settings, historical or usage information, or user profile of the user, etc.

In some embodiments, the application center 510 is located on the network side. The application center 510 can obtain the application information by gathering it or manually noting it. For example, the application center 510 can receive application information submitted by the developer of the application, or user-noted application information can be obtained based on feedback from the client.

Application center 510 can store the application information in separate files, or in a configuration file, such as an application Manifest. Application center 510 can make the application information (or the separate file or configuration file associated therewith) available for download. The Manifest can be a file that describes the applications.

Application manager (AppManager) 520 can be located on the smart terminal side. Application manager 520 can be configured to perform dynamic management of the applications on the smart terminal. The dynamic management of applications can comprise installation, uninstallation, startup, stoppage, etc. According to various embodiments, application manager 520 is started up after startup of the smart terminal. According to various embodiments, application manager 520 is started up in connection with startup of the smart terminal In some embodiments, application manager 520 determines the applications already installed on the smart terminal and obtains the corresponding application information corresponding to the applications installed on the smart terminal. Application manager 520 can obtain the usage information of the applications installed on the smart terminal. Characteristics of the installed applications can be obtained by application manager 520.

According to various embodiments, service module 530 is located on the smart terminal side. Service module 530 can be configured to download, decompress, and manage service content. For example, service module 530 is configured to communicate with a server (e.g., the service server). Service module 530 can process the service content to obtain texture data that conforms to a preset texture format. In some embodiments, service module 530 is configured to, before the startup command for the target application is received, start up and provide the service content for the corresponding target services to the target application.

According to various embodiments, service module 530 obtains service configuration information from the service server. The service configuration information can comprise the characteristics of the service. Service module 530 can obtain characteristics of installed applications from the application manager 520. As an example, service module 530 obtains the characteristics of the service and the characteristics of the installed applications contemporaneously (e.g., at the same time). Service module 530 can determine a service corresponding to personalization characteristics of a user, or preferences, settings, historical or usage information, or user profile of the user, etc. For example, service module 530 can obtain the personalization characteristics of a user, or preferences, settings, historical or usage information, or user profile of the user, etc. based at least in part on the characteristics of the application. In response to determining the service content, service module 530 obtains the corresponding service content.

In some embodiments, service module 530 obtains the corresponding personalization characteristics based on the historical behavioral data associated with the user and determines the service based on the personalization characteristics of the user. For example, service module 530 determines a service matching the personalization characteristics of a user, or preferences, settings, historical or usage information, or user profile of the user, etc. In response to determining the service, service module 530 obtains the corresponding service content for the successfully matched service.

According to various embodiments, service module 530 sends service configuration information to the application manager 520, in order to enable the application manager 520 to determine the service based on a mapping of user personalization characteristics (e.g., personalization characteristics of a user, or preferences, settings, historical or usage information, or user profile of the user, etc.) to services or mappings of characteristics of the services. Application manager 520 sends the information of the service (e.g., a successfully matched service) to the service module 530. For example, application manager 520 provides service module 530 with information identifying (e.g., a service identifier) the service matching the personalization characteristics of a user, or preferences, settings, historical or usage information, or user profile of the user, etc. Service module 530 can obtain the corresponding service content for the successfully matched service.

Figure 6:
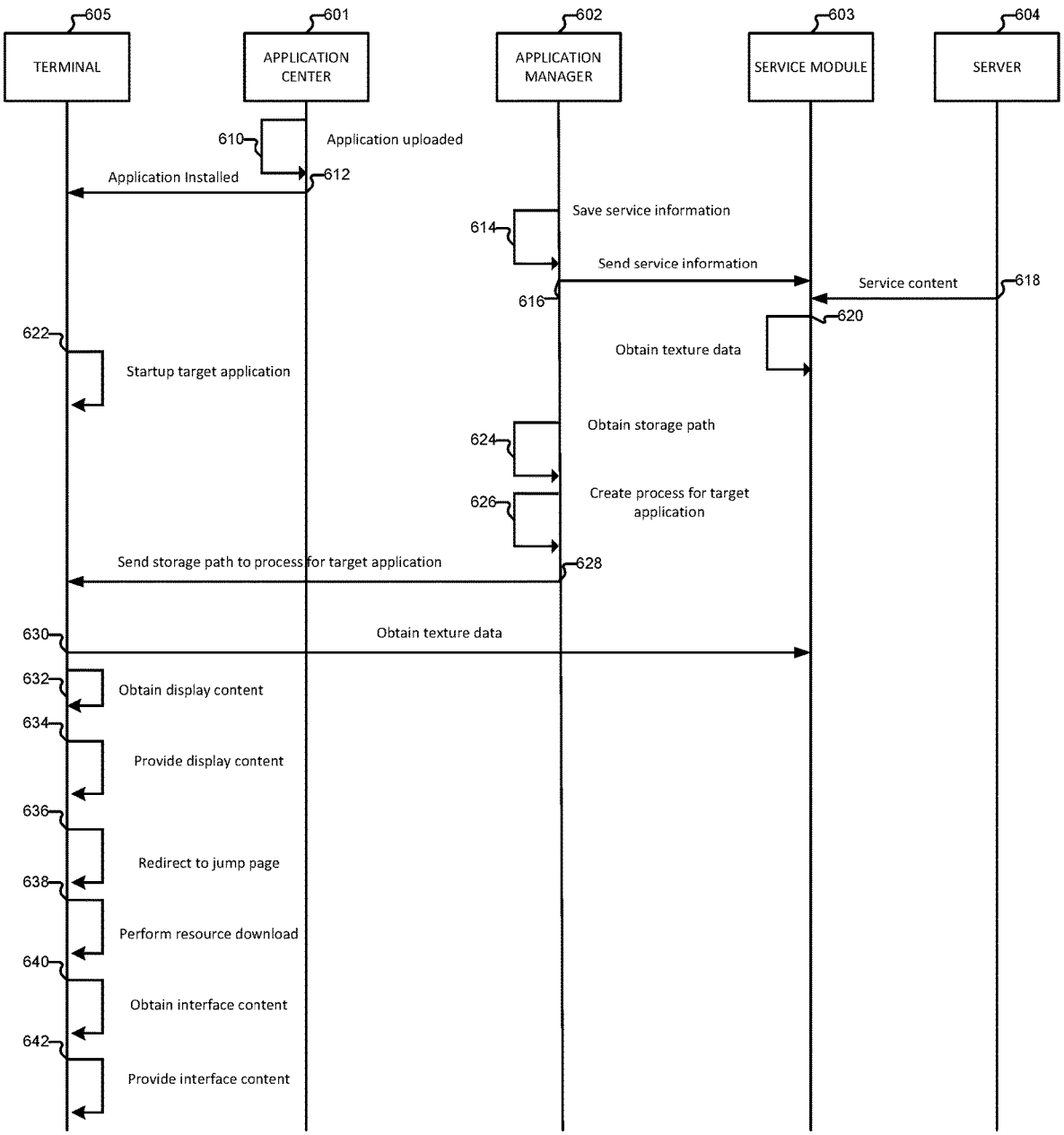
FIG. 6 is a flowchart of an example method for processing a service according to various embodiments of the present application.

FIG. 6 is a flowchart of an example method for processing a service according to various embodiments of the present application.

Referring to FIG. 6, process 600 is provided. Process 600 can be implemented in connection with process 100 of FIG. 1, process 200 of FIG. 2, process 300 of FIG. 3, and/or process 400 of FIG. 4. Process 600 can be implemented in connection with system 500 of FIG. 5. Process 600 can be implemented at least in part by system 700 of FIG. 7.

At 610, an application is loaded. The application can be loaded to application center 601. In some embodiments, application developers can upload developed applications to application center 601. The application center 610 can be an app store, etc.

At 612, an application is installed. For example, the application is installed on terminal 605. The user can download applications from the application center 601 to terminal 605. The downloaded applications can be installed on the terminal 605.

At 614, service information is saved. In some embodiments, application manager 602 saves the service information. Application manager 602 can obtain (e.g., determine) the applications installed on the terminal 605 and the corresponding application information. In some embodiments, application manager 602 obtains the usage information for the applications installed on the terminal 605. For example, application manager 602 obtains characteristics of the installed applications to be obtained. Application manager 602 can obtain (e.g., determine) service information that matches the characteristics of the applications installed on the terminal.

At 616, service information is communicated to service module 603. For example, application manager 602 sends the service information to the service component 603.

At 618, service module 603 obtains the service content corresponding to the service information. For example, service module 603 downloads the service content from server 604.

At 620, texture data is obtained. For example, service module 603 converts the downloaded service content into texture data that conforms to a preset texture format.

At 622, the target application is started up. The target application can be started up (e.g., launched) in response to terminal 605 obtaining a startup command with respect to the target application. The startup command can be input to terminal 605 by a user.

At 624, a storage path is obtained. For example, application manager 602 obtains the storage path information of the target service corresponding to the target application. A mapping of characteristics of the applications to the characteristics of services can be queried and a service matching the characteristics of the target application can be determined. The service matching the characteristics of the target application can be deemed the target service.

At 626, a process for the target application is created. The application manager 602 can create the process of the target application.

At 628, the storage path information is communicated to the process of the target application. For example, application manager 602 sends this storage path information to the process of the target application. The storage path information is communicated to the process of the target application to enable the process of the target application to asynchronously invoke the service processing module, and send the storage path information to the service processing module.

At 630, the texture data is obtained. For example, the terminal reads the texture data of the target service corresponding to said target application based on the storage path information. In some embodiments, the service processing module reads the texture data of the target service corresponding to the target application based on the storage path information.

At 632, display content is obtained. In some embodiments, the service processing module uses the graphics processing unit of terminal 605 to process the texture data to obtain the display content corresponding to the target service.

At 634, the display content is provided. For example, the display content corresponding to the target service is displayed on terminal 605 (e.g., on a screen or display unit of terminal 605).

636, 638, 640, and 642 can be provided according to various embodiments. For example, process 600 can end at 634, or can proceed to 636-642.

At 636, the terminal is redirected to a jump page. For example, in response to receiving a user input with respect to the display content (e.g., a click operation with respect to the display content), the process jumps from the current page to a preset jump page.

At 638, a resource download is performed. For example, the process of the target application creates and initializes a rendering engine, and performs a resource download based on the description file of the target application.

At 640, interface content is obtained. For example, the rendering engine is utilized to perform layout rendering and interface drawing with respect to the downloaded resource, in order to obtain the corresponding interface content.

At 642, the interface content is provided. In some embodiments, in response to a determination that interface content conforms to preset conditions, the providing of the display content corresponding to the target service is stopped and the interface content is presented.

According to various embodiments, the corresponding service content is obtained based on the personalization characteristics. The service content is converted into texture data in a preset texture format that the application processor is able to recognize, and the texture data is stored in advance. According to conventional art, the corresponding service content is retrieved from the service server only after the startup command with respect to the target application being received is obtained. In contrast, according to various embodiments, the service module can obtain the corresponding texture data from the service server upon installation of an application on the terminal. For example, the texture data is prepared (e.g., determined, generated, etc.) before the startup command for the target application is received. Accordingly, the retrieval speed of the service display content can be increased, and the display time of the service content can be improved (e.g., the service content can be displayed sooner).

According to various embodiments, texture data is configured according to a preset texture format that the application processor can recognize can be stored in advance. Accordingly, an occurrence of a problem of the smart terminal GPU not supporting the texture format of the texture data during the course of processing the service content processing is avoided. According to conventional art, the corresponding service content is retrieved from the service server and the corresponding texture data is obtained through decoding processing only after the startup command with respect to the application is received. In contrast, according to various embodiments, decoding processing of the service content does not need to be performed during the course of starting up the application, but rather, the texture data can be provided to the GPU for rendering processing to obtain the corresponding service display content, thus saving the corresponding decoding processing time, thereby enabling a further increase in the speed of retrieval of the display content, and improving the display time of the service content(e.g., the service content can be displayed sooner).

According to various embodiments, because decoding processing of the service content does not need to be performed during the course of starting up the application, the memory required for the decoded content is saved, thereby enabling a reduction in the peak memory required by the terminal.

According to various embodiments, the corresponding service content can be retrieved based on the personalization characteristics of the user, thus enabling an increase in the level of compatibility of the service content with respect to preferences, settings, historical or usage information, or user profile of the user, etc., which therefore allows for more accurate providing of service content that is of interest to the user, thereby increasing the hit rate of the provided service content (e.g., the corresponding displayed display content).

According to various embodiments, during the startup process of the target application, target services that are compatible with the target application are provided to the user during the startup process of the target application, thus enabling an increase in the hit rate of the provided service content. For example, if no e-commerce type applications are installed on the terminal, online shopping type services are not provided to the user.

According to various embodiments, service content that corresponds to the characteristics of the target application is provided to the user. For example, service content that corresponds to November Sale Day activities for e-commerce type applications is provided to the user. Accordingly, the hit rate of the service content provided to the user is improved. In addition, because low-frequency applications can reflect the user preferences, a value can be obtained with respect to even low-frequency applications, enabling additional income to be generated based on the low-frequency applications.

According to conventional art, the application downloads service content from the corresponding server and provides service content during the startup process of the application, and the service content and application have a one-to-one correspondence there between. According to various embodiments, the application manager provides service content to any corresponding application. For example, the texture data of services stored in advance can apply to any application, thereby increasing the applicable scope of the service content, and saving the bandwidth required for different applications to repetitively download service content.

Figure 7:
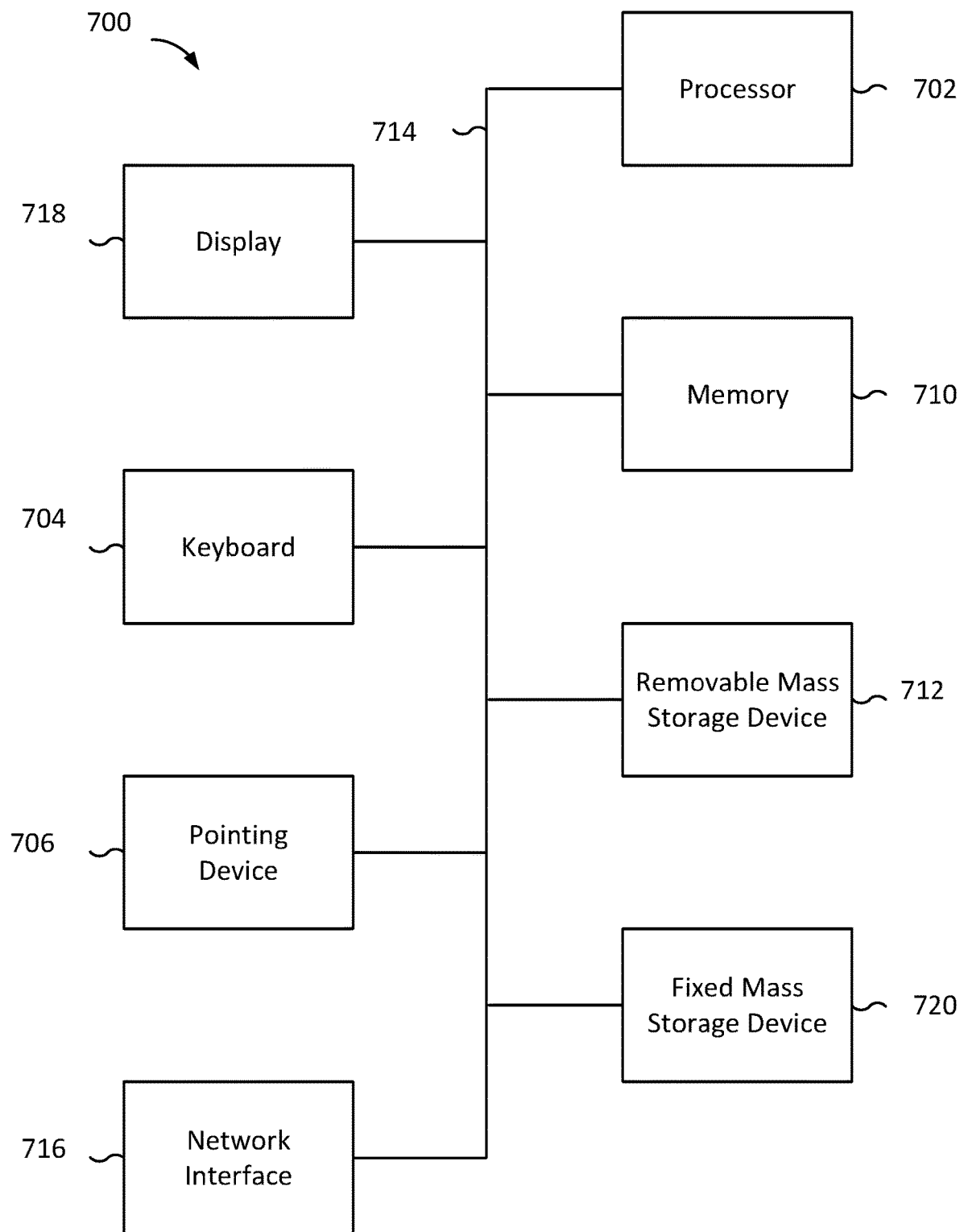
FIG. 7 is a functional diagram of a computer system for processing a service according to various embodiments of the present application.

FIG. 7 is a functional diagram of a computer system for processing a service according to various embodiments of the present application.

Referring to FIG. 7, computer system 700 for processing a service is provided. Computer system 700 can implement at least part of process 100 of FIG. 1, process 200 of FIG. 2, process 300 of FIG. 3, process 400 of FIG. 4, system 500 of FIG. 5, and/or process 600 of FIG. 6.

Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The present application is described based on the flowcharts and/or block diagrams of the method, devices (system), and computer program products of the embodiments of the present application. It should be understood that each flowchart and/or block diagram within the flowcharts and/or block diagrams and combinations of flowcharts and/or block diagrams within the flowcharts and/or block diagrams can be realized by computer program commands. These computer program commands can be provided to general-purpose computers, special-purpose computers, embedded processors, or the processors of other programmable data processing devices, to give rise to a machine which, through commands executed by the processor of a computer or other programmable data processing equipment, gives rise to a device used to realize the functions designated in one or more processes in a flowchart and/or one or more blocks in a block diagram.

All of the various embodiments in this specification are described in a progressive manner, and the description of each embodiment emphasizes the areas of difference from the other embodiments; mutual reference may be made to the portions of the various embodiments that are identical or similar to one another.

Persons skilled in the art should understand that the embodiments of the present application can be provided as methods, devices, or computer program products. Therefore, the embodiments of the present application can be implemented in forms that consist entirely of hardware, consist entirely of software, or that are a combination of software and hardware. Moreover, the embodiments of the present application can take the form of computer program products implemented on one or more computer-usable storage media (including, but not limited to, magnetic disk memory, CD-ROM, and optical memory) that contain computer-usable program code.

In one typical configuration, said computer equipment comprises one or more processors (CPUs), input/output interfaces, network interfaces, and internal memory. Internal memory may comprise such forms as volatile memory in computer-readable storage media, random access memory (RAM), and/or non-volatile memory, such as read-only memory (ROM) or flash memory (flash RAM). Internal memory is an example of a computer-readable medium. Computer-readable media include non-volatile and volatile, and removable and non-removable media that can realize the storage of information by any method or technology. Information can be computer-readable commands, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other internal memory technology, compact disk read-only memory (CD-ROM), digital versatile disk (DVD) or other optical storage, magnetic tape cassette, magnetic tape or magnetic disk storage, or other magnetic storage equipment or any other non-transmission medium that can be used to store information accessible by a computer. As defined in this document, computer-readable media do not include transitory computer-readable media, such as modulated data signals and carrier waves.

The embodiments of the present application are described with reference to flowcharts and/or block diagrams of the methods, terminal equipment (systems), and computer program products offered in the embodiments of the present application. It should be understood that each process and/or block in the flowcharts and/or block diagrams and combinations of processes and/or blocks in the flowcharts and/or block diagrams can be realized using computer program commands. These computer program commands can be provided to the processor of a general purpose computer, specialized computer, imbedded processor, or other programmable data processing terminal equipment to give rise to a machine, such that the commands executed by the processor of a computer or other programmable data processing terminal equipment give rise to a device intended to realize the functions designated in one process or multiple processes in a flowchart and/or one block or multiple blocks in a block diagram.

These computer program commands can also be stored in computer-readable memory that can guide a computer or other programmable data processing terminal equipment to operate in a specified manner, so that the commands stored in this computer-readable memory give rise to a product that includes the command device, and this command device realizes the functions designated in one process or multiple processes in a flowchart and/or one block or multiple blocks in a block diagram.

These computer program commands can also be loaded onto a computer or other programmable data processing terminal equipment, so that a series of operational steps are executed on the computer or other programmable data processing terminal equipment to give rise to computer-realized processing, so that the commands executed on the computer or other programmable data processing terminal equipment provide the steps intended to realize the functions designated in one process or multiple processes in a flowchart and/or one block or multiple blocks in a block diagram.

Although preferred embodiments of the present application have already been described, once persons skilled in the art grasp the basic creative concept, they can make additional modifications to these embodiments. Therefore, the attached claims are intended to be interpreted as including the preferred embodiments and all modifications and revisions that fall within the scope of the embodiments of the present application.

Finally, it must also be noted that in the present document, all relational terms such as first and second are only intended to distinguish one entity or operation from another entity or operation, and do not necessarily require or imply the existence of any such actual relationship or sequence between such entities or operations. Moreover, the terms "comprise," "contain," or any other variants thereof are intended to cover non-exclusive inclusion, so that processes, methods, objects, or terminal equipment that comprises a series of elements not only includes those elements, but also includes other elements that are not explicitly enumerated, or also includes elements that are inherent to such processes, methods, objects, or terminal equipment. In the absence of greater restrictions, for elements defined as "comprising one . . . ", the additional existence of identical elements in processes, methods, objects, or terminal equipment that includes said element is not excluded.

The above is a detailed overview of a service processing method, a service processing device, and a smart terminal offered in the present application. This document has utilized specific examples to expound the principles and implementation methods of the present application, and the descriptions of the embodiments above are only intended to aid in understanding the method and the core ideas of the present application; at the same time, persons with ordinary skill in the art can have areas of modification in both the specific implementation method and the scope of the application based on the ideas of the present application. To summarize, the content of this specification should not be understood to limit the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by a terminal, service content from a server;
    processing, by the terminal, the service content to convert at least a part of the service content to texture data, wherein items of service content are converted to texture data such that items having relatively higher priorities are converted before items having relatively lower priorities;
    storing, in a local storage of the terminal, the texture data for at least a target application installed on the terminal, wherein:
        the texture data corresponds to the service content for a target service provided by one or more servers;
        the texture data is generated based on a processing of the service content into a preset texture format; and
        the preset texture format corresponds to a format that is processed by a graphics processing unit of the terminal to obtain display content without conversion of the texture data by a central processing unit;
    receiving, by the terminal, a startup command for the target application, wherein the texture data is stored in the local storage before the startup command is received;
    in response to receiving the startup command for the target application, obtaining texture data associated with the target application from the local storage of the terminal, wherein:
        the texture data that is obtained is determined based at least in part on an application type of the target application, and one or more of an application tag and an application activity tag;
        the one or more of the application tag and the application activity tag are used to differentiate applications having the same application type; and
        the application activity tag is different from usage information;
    obtaining display content corresponding to the target service based at least in part on the texture data;
    providing the display content corresponding to the target service on the terminal, wherein:
        the display content is provided while interface content associated with the target application is obtained; and
    in response to a determination that one or more preset conditions associated with obtaining the interface content is satisfied, stopping display of the display content and providing the interface content.

2. The method of claim 1, wherein the obtaining the texture data comprises:
    determining the target service based at least in part on a mapping of characteristics of applications to characteristics of services stored.

3. The method of claim 2, wherein the characteristics of the applications comprise one or more of an application type, the application tag, the application activity tags, and user information.

4. The method of claim 1, wherein the obtaining the texture data comprises:
    obtaining a storage path information of the texture data of the target service corresponding to the target application; and
    reading the texture data of the target service corresponding to the target application, the texture data being read based at least in part on the storage path information.

5. The method of claim 1, wherein the service content comprises: service content that corresponds to personalization characteristics of a user.

6. The method of claim 1, wherein the obtaining the texture data comprises:
    in response to receiving the startup command for the target application, determining the target service corresponding to the target application based at least in part on a mapping of characteristics of applications to characteristics of services stored;
    obtaining a storage path information of the target service;
    providing the storage path information to a process of the target application;
    invoking, by the process of the target application, a service processing module, the service processing module being invoked asynchronously;
    providing the storage path information to the service processing module; and
    reading, by the service processing module, the texture data of the target service corresponding to the target application based at least in part on the storage path information.

7. The method of claim 1, further comprising:
    in response to stopping the providing of the display content corresponding to the target service, providing presentation information corresponding to the service content to a service module or a service server.

8. A method, comprising:
obtaining service content from a server;
converting the service content into texture data that conforms to a preset texture format, wherein:
the converting the service content into the texture data comprises: processing, by a terminal, the service content to convert at least a part of the service content to texture data;
the items of service content are converted to texture data such that items having relatively higher priorities are converted before items having relatively lower priorities;
the preset texture format corresponds to a format that is processed by a graphics processing unit of the terminal to obtain display content without conversion of the texture data by a central processing unit; and
storing, by the terminal, the texture data in advance of receiving a startup command with respect to a target application for which the texture data is to be used for displaying corresponding display content while interface content for the target application is obtained, wherein:
the texture data associated with an application type of the target application, and one or more of an application tag and an application activity tag; and
the one or more of the application tag and the application activity tag are used to differentiate applications having a same application type.

9. The method of claim 8, wherein:
the obtaining the service content comprises:
retrieving the corresponding service content based at least in part on personalization characteristics of a user; and
the obtaining the corresponding service content based at least in part on the personalization characteristics of the user comprises:
determining the corresponding service content based at least in part on a mapping of the personalization characteristics of the user to characteristics of services.

10. The method of claim 8, wherein:
the obtaining the service content comprises: obtaining the corresponding service content based at least in part on personalization characteristics of a user; and
the obtaining the corresponding service content based at least in part on the personalization characteristics of the user comprises:
obtaining the corresponding service content based at least in part on a sequence of priorities corresponding to the personalization characteristics of the user.

11. The method of claim 10, wherein the sequence of priorities corresponding to the personalization characteristics of the user corresponds to application activity tags, personalization characteristics corresponding to application tags, and personalization characteristics corresponding to application types.

12. The method of claim 8, wherein obtaining the service content comprises:
obtaining advertisement configuration information from an advertising server, wherein the advertisement configuration information includes characteristics of an advertisement;
obtaining characteristics of installed applications from an application manager of the terminal; and
determining a target advertisement based at least in part on one more mappings with respect to personalization characteristics of a user, the characteristics of the installed applications, and characteristics of advertisements.

13. The method of claim 12, wherein personalization characteristics of the user are obtained based at least in part on historical behavior data of the user, the characteristics of applications installed on the terminal, or both.

14. The method of claim 12, wherein characteristics of the applications comprise one or more of an application type, the application tag, the application activity tag, and the usage information; and
a sequence of priorities corresponding to the personalization characteristics comprises: personalization characteristics corresponding to the application activity tag, personalization characteristics corresponding to the application tag, and personalization characteristics corresponding to the application type.

15. A device, comprising:
one or more processors configured to:
obtain service content from a server;
process the service content to convert at least a part of the service content to texture data, wherein items of service content are converted to texture data such that items having relatively higher priorities are converted before items having relatively lower priorities;
store, in a local storage of the device, the texture data for at least a target application installed on the device, wherein:
the texture data corresponds to the service content for a target service provided by one or more servers;
the texture data is generated based on a processing of the service content into a preset texture format; and
the preset texture format corresponds to a format that is processed by a graphics processing unit of the device to obtain display content without conversion of the texture data by a central processing unit;
receive a startup command for the target application, wherein the texture data is stored in the local storage before the startup command is received;
in response to receiving the startup command for the target application, obtain texture data associated with the target application from the local storage of the device, wherein:
the texture data that is obtained is determined based at least in part on an application type of the target application, and one or more of an application tag and an application activity tag;
the one or more of the application tag and the application activity tag are used to differentiate applications having the same application type; and
the application activity tag is different from usage information;
obtain display content corresponding to the target service based at least in part on the texture data;
provide the display content corresponding to the target service on the device, wherein:
the display content is provided while interface content associated with the target application is obtained;
in response to a determination that one or more preset conditions associated with obtaining the interface content is satisfied, stop display of the display content and provide the interface content; and one or more memories coupled to the one or more processors, configured to provide the one or more processors with instructions.

16. A computer program product, the computer program product being embodied in a non-transitory computer readable storage medium and comprising computer instructions for:

obtaining, by a terminal, service content from a server;

processing, by the terminal, the service content to convert at least a part of the service content to texture data, wherein items of service content are converted to texture data such that items having relatively higher priorities are converted before items having relatively lower priorities;

storing, in a local storage of the terminal, the texture data for at least a target application installed on the terminal, wherein:

the texture data corresponds to the service content for a target service provided by one or more servers;

the texture data is generated based on a processing of the service content into a preset texture format; and the preset texture format corresponds to a format that is processed by a graphics processing unit of the terminal to obtain display content without conversion of the texture data by a central processing unit;

receiving, by the terminal, a startup command for the target application, wherein the texture data is stored in the local storage before the startup command is received;

in response to receiving the startup command for the target application, obtaining texture data associated with the target application from the local storage of the terminal, wherein:

the texture data that is obtained is determined based at least in part on an application type of the target application, and one or more of an application tag and an application activity tag;

the one or more of the application tag and the application activity tag are used to differentiate applications having the same application type; and the application activity tag is different from usage information;

obtaining display content corresponding to the target service based at least in part on the texture data;

providing the display content corresponding to the target service on the terminal, wherein:

the display content is provided while interface content associated with the target application is obtained; and in response to a determination that one or more preset conditions associated with obtaining the interface content is satisfied, stopping display of the display content and providing the interface content.

\* \* \* \* \*